(12) United States Patent
Komatsu et al.

(10) Patent No.: US 8,674,978 B2
(45) Date of Patent: Mar. 18, 2014

(54) ELECTROPHORETIC DISPLAY, ELECTROPHORETIC DISPLAY DEVICE AND ELECTRONIC APPARATUS

(75) Inventors: Harunobu Komatsu, Matsumoto (JP); Takeo Kawase, Suwa (JP); Masashi Kanai, Azumino (JP); Kenji Fukasawa, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 1004 days.

(21) Appl. No.: 12/732,765

(22) Filed: Mar. 26, 2010

(65) Prior Publication Data

US 2011/0025681 A1 Feb. 3, 2011

(30) Foreign Application Priority Data

Jul. 30, 2009 (JP) ................................. 2009-177754
Jan. 21, 2010 (JP) ................................. 2010-011148

(51) Int. Cl.
*G06F 3/038* (2013.01)
*G09G 5/00* (2006.01)
*G09G 3/34* (2006.01)

(52) U.S. Cl.
USPC .............. 345/214; 345/32; 345/107; 345/211

(58) Field of Classification Search
None
See application file for complete search history.

(56) References Cited

U.S. PATENT DOCUMENTS

| 2002/0063673 | A1* | 5/2002 | Kawai | 345/97 |
| 2002/0175891 | A1 | 11/2002 | Obikawa et al. | |
| 2003/0231162 | A1* | 12/2003 | Kishi | 345/107 |
| 2004/0070554 | A1* | 4/2004 | Katase | 345/32 |
| 2005/0190431 | A1 | 9/2005 | Matsuda | |
| 2008/0316168 | A1 | 12/2008 | Matsuda | |
| 2009/0268274 | A1 | 10/2009 | Masuzawa et al. | |

FOREIGN PATENT DOCUMENTS

| JP | A-2002-268098 | 9/2002 |
| JP | A-2004-4773 | 1/2004 |
| JP | A-2005-084167 | 3/2005 |
| JP | A-2005-242320 | 9/2005 |
| JP | A-2009-9025 | 1/2009 |
| JP | A-2009-009092 | 1/2009 |
| JP | A-2009-98382 | 5/2009 |
| WO | WO 9953373 A1 * | 10/1999 |

* cited by examiner

*Primary Examiner* — Alexander S Beck
*Assistant Examiner* — Kirk Hermann
(74) *Attorney, Agent, or Firm* — Oliff PLC

(57) ABSTRACT

An electrophoretic display includes: a plurality of spatially divided cells; and plural types of color substances contained in each of the cells wherein a display color is controlled by controlling electrophoresis of the colored substances within the cells, wherein each of a first cell, a second cell and a third cell included in the plurality of cells includes a first color substance corresponding to a mutually differing one of three primary colors in additive color mixing or subtractive color mixing and a second color substance in a relationship of complementary colors with the first color substance, wherein the first cell is controlled to be in a display state by the first color substance, and the second and third cells are controlled to be in a display state by the second color substance, respectively.

12 Claims, 17 Drawing Sheets

ELECTROPHORETIC DISPLAY, ELECTROPHORETIC DISPLAY DEVICE AND ELECTRONIC APPARATUS

The entire disclosure of Japanese Patent Application Nos: 2009-177754, filed Jul. 30, 2009 and 2010-011148, filed Jan. 21, 2010 are expressly incorporated by reference herein.

BACKGROUND

1. Technical Field

The present invention relates to display technology using electrophoresis of charged particles in a solution.

2. Related Art

When electrical fields are applied to a dispersion liquid in which charged particles are dispersed in a solution (dispersion medium), the particles move (electrophoretically migrate) in the dispersion medium by a Coulomb force. This phenomenon is called electrophoresis, and electrophoretic display devices (EPDs) that display desired information including images using the electrophoresis are known.

As an example structure of EPD, for example, Japanese laid-open patent application 2004-4773 (Patent Document 1) describes a structure in which a space between a pair of substrates is divided by partitions into a plurality of closed spaces (cells), and a dispersion system containing charged particles (electrophoretic particles) and dispersing medium are sealed in each of the cells.

Each of the cells of the EPD can be made to correspond to each one of pixels, and a full color display can be achieved by arranging three different colors (for example, red, green and blue) to correspond to each three of the cells. The cells may be arranged to have a structure, for example, in which (1) white particles, black particles and colored dispersion liquid are filled; (2) white particles, black particles and colored particles are filled; or (3) white particles and black particles are filled, and color filters are added.

According to the cell structures (1) and (2) described above, when a red color is to be displayed, the other two (i.e., green and blue) pixels other than the pixel displaying red are respectively controlled to be in a white or black displaying state. Specifically, in this case, the three pixels may be placed in a displaying state of (red, white and white), (red, white and black) or (red, black and black). When displaying a green color or a blue color, the remaining two pixels other than the pixel of a target color (single color) to be displayed are similarly arranged to be in a white or black displaying state.

In other words, even when one of the three primary colors (red, green and blue) is to be displayed, the target color is not displayed with the entire color area (of three pixels) of the three colors. The target color can actually be displayed with merely one third (⅓) of the color area of the three colors (three pixels), in other words, with merely one pixel.

SUMMARY

In accordance with some embodiments of the invention, the display performance of an electrophoretic display device, for example, the efficiency of single color display and the chroma can be improved.

In accordance with other embodiments of the invention, it is also possible to provide effects that can only be derived from the composition of each of the embodiments of the invention to be described below, and that cannot be obtained by the conventional art.

An electrophoretic display in accordance with an embodiment of the invention pertains to an electrophoretic display having a plurality of spatially divided cells and plural types of color substances contained in the cells wherein the display color is controlled by controlling electrophoresis of the colored substances within the cells. Each of a first cell, a second cell and a third cell included in the plurality of cells includes a first color substance corresponding to a mutually differing one of three primary colors in additive color mixing or subtractive color mixing and a second color substance in a relationship of complementary colors with the first color substance. In one aspect, the first cell may be controlled to be in a display state by the first color substance, and the second and third cells may be controlled to be in a display state by the second color substance, respectively.

By this, the second and third cells display a mixed color of the second color substances, which is equivalent to displaying a display color of the first color substance of the first cell. As a result, a single color corresponding to the first color substance can be displayed with the three cells.

The first color substance and the second color substance may be color particles electrically charged with mutually opposite (positive and negative) polarities, respectively. This makes it possible to individually control locally gathered regions and electrophoretic paths of the first and second color particles in the cells.

Furthermore, each of the first, second and third cells may further contain white particles or a white solvent. This makes it possible to display a white color with all of the three cells.

The white particles may be electrically non-charged or may have a charge amount smaller than a charge amount of either of the first and second color substance. By this, the distribution of the white particles or the white solvent in the cells can be controlled relatively in association with electrophoretic control of the color particles.

Also, the first color substance may be color particles having a first color, and the second color substance may be a color solvent having a second color different from the first color. This makes it possible to display a single color corresponding to the first color substance with the three cells.

In this case, each of the first, second and third cells may further include white particles. This makes it possible to display a white color with all of the three cells. It is noted that the white particles may be charged with a polarity opposite to the charge polarity of the first color substance. By this, locally gathered areas and electrophoretic paths of the first color particles and the white particles in the cells can be individually controlled.

When the first cell is controlled to be in a display state with the first color substance together with the second color substance, each of the second and third cells may be controlled to be in a display state with the second color substance together with the first color substance. This enables each of the three cells to display a mixed color with the first and second color substances.

Moreover, an electrophoretic display device in accordance with an embodiment of the invention is equipped with any one of the electrophoretic displays described above and a control circuit that controls the display state. By this, it is possible to realize an electrophoretic display device capable of displaying a single color corresponding to the first color substance with the three cells.

Furthermore, an electronic apparatus in accordance with an embodiment of the invention is equipped with the electrophoretic display device. This makes it possible to realize an electronic apparatus capable of displaying a single color corresponding to the first color substance with the three cells.

DESCRIPTION OF EXEMPLARY EMBODIMENTS

Figure 1:
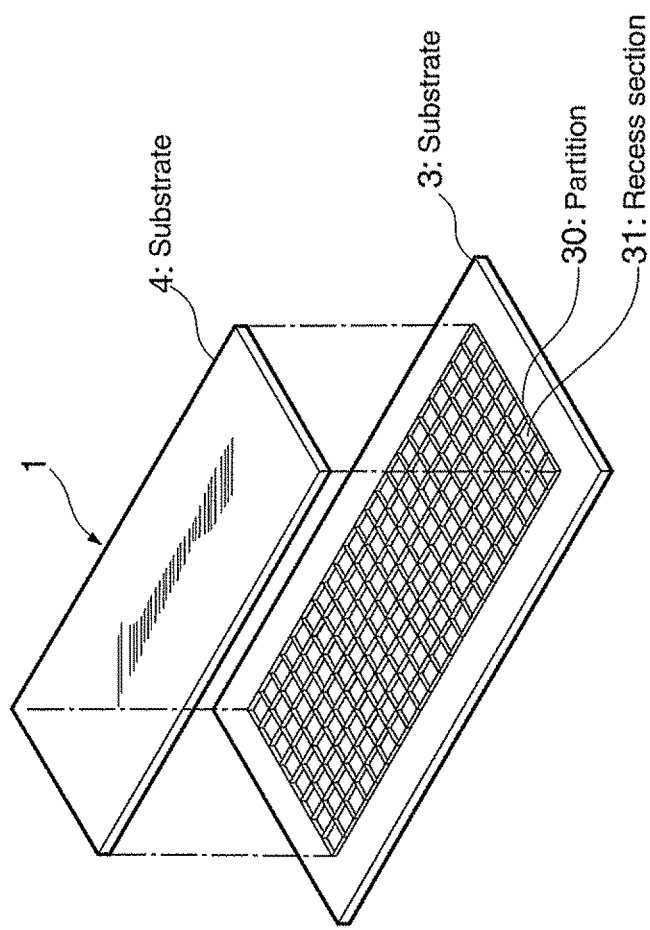
FIG. 1 is an exploded perspective view schematically showing an electrophoretic display device in accordance with an embodiment of the invention.

Preferred embodiments of the invention are described below with reference to the accompanying drawings. It is noted that embodiments to be described below are exemplary illustrations, and are not intended to exclude applications of various modifications and technology that are not explicitly stated hereunder. In other words, the invention can be implemented with various modifications (through combining the embodiments and the like) within the range that does not depart from the subject matter. In the descriptions of the drawings, identical or similar components are appended with identical or similar reference numerals. The drawings are schematic presentations, and do not necessarily match with the actual measurements or ratios. The drawings may contain portions that are mutually different in their measurement relations and ratios.

Embodiment

Figure 2:
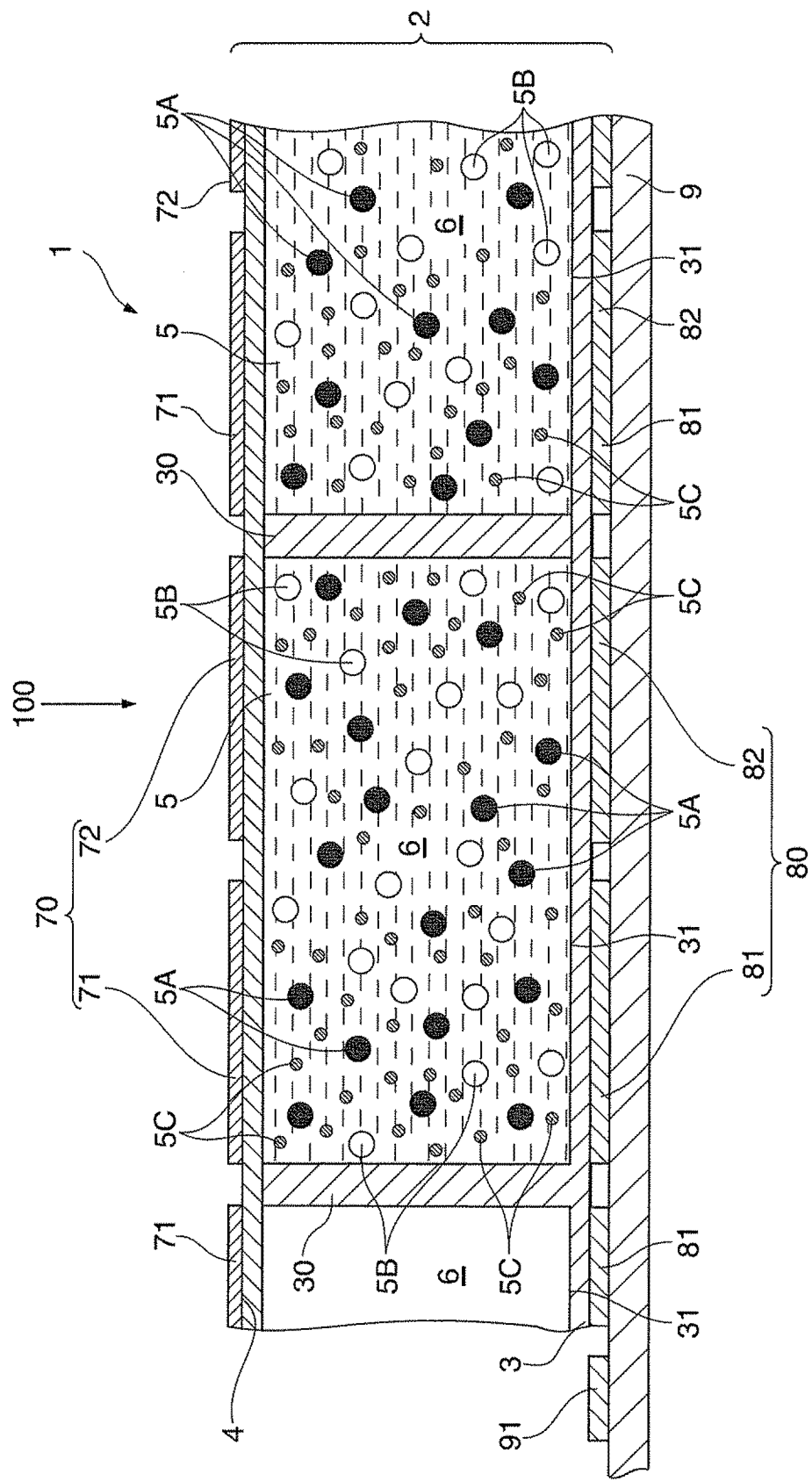
FIG. 2 is a schematic cross-sectional view in part of the electrophoretic display device exemplified in FIG. 1.
Figure 3:
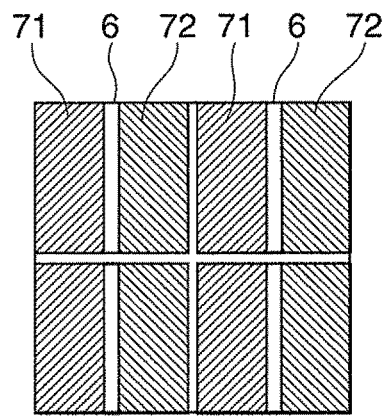
FIG. 3 is a plan view showing an example of the shape and arrangement of electrodes of the electrophoretic display device exemplified in FIG. 1 and FIG. 2.

FIG. 1 is an exploded perspective view schematically showing an electrophoretic display device 1 in accordance with an embodiment of the invention. FIG. 2 is a schematic cross-sectional view in part of the electrophoretic display device 1 exemplified in FIG. 1. FIG. 3 is a plan view showing an example of the shape and arrangement of electrodes of the electrophoretic display device 1 exemplified in FIG. 1 and FIG. 2. An arrow 100 shown in FIG. 2 represents a viewing direction of an observer who is looking at the electrophoretic display device 1, and FIG. 3 corresponds to a plan view as viewed at a plane in the viewing direction 100.

As shown in FIG. 1 and FIG. 2, the electrophoretic display device 1 in accordance with the present embodiment is equipped with, for example, a substrate 3, a plurality of recesses 31 spatially divided by a plurality of partitions 30 on one surface of the substrate 3, and a substrate 4 bonded to each of the partitions 30 in a manner to cover opening sections of the recesses 31.

The partitions 30 may be obtained by forming wall sections (protrusions) having a predetermined pattern on one surface of the substrate 3. As an example of the method of forming such protrusions, an ink jet method (a droplet ejection method), a printing method such as a screen printing method, a gravure printing method, a nanoimprint method and the like, a photolithography method and the like may be enumerated. As another example, the partitions 30 can also be formed through forming a layer of material for forming the protrusions on the substrate 3, and then performing mechanical, physical or chemical etching, or performing mechanical processing with laser, embossing or the like, or blasting treatment on the layer according to a predetermined pattern.

As a constituent material of the partitions 30, various kinds of resin materials, such as, epoxy-based resin, acryl-based resin, urethane-based resin, melamine-based resin and phenol-based resin; and various kinds of ceramics materials, such as, silica, alumina, titania ceramics and the like can be enumerated. One or more types selected from among these resin materials may be used. As a non-limiting example, permanent photoresist TMMR S2000 for MEMS manufactured by Tokyo Ohka Kogyo Co., Ltd may be used. An average height of the partitions 30 in a direction perpendicular to the substrate 30, in other words, the distance between the substrates 3 and 4, may be about 10-500 μm, as an example without any particular limitation.

The closed spaces 6 formed by internal walls of the recesses 31 and the substrate 4 are called cells, and a solution (dispersion liquid) 5 in which particles 5A-5C are dispersed (suspended) in a predetermined solvent (dispersion medium) is sealed in each of the cells 6. A task of dispersing the particles 5A-5C in the dispersion medium 6 may be performed by using one or a combination of two or more of, for example, a paint shaker method, a ball mill method, a media mill method, an ultrasonic dispersion method and a stirrer dispersion method.

Each of the cells 6 may be made to correspond to a single pixel. For example, when performing a full-color display, each three of the cells 6 may be made to correspond to three different colors, respectively. As the different three colors, three primary colors (red, green and blue) in additive color mixing or three primary colors (cyan, magenta and yellow) in subtractive color mixing that are in complementary color relation with the aforementioned three primary colors may be used.

Each of the cells 6 may have any shape, such as, for example, a triangle, a quadrilateral, a hexagon, a circle, an oval or the like in a plan view in the viewing direction 100. For example, the each of the cells 6 may be formed in a hexagonal shape, thereby forming a cell pattern in a honeycomb configuration. As a result, the mechanical strength of a display section (an electrophoretic display 2) can be improved.

Two electrodes 81 and 82 are provided for each of the cells 6 on both sides of another surface side of the substrate 3 (on the side viewable in a direction opposite to the viewing direction 100), and two electrodes 71 and 72 are provided for each of the cells on a surface of the substrate 4 on the side that is viewable in the viewing direction 100. In other words, the four electrodes 71, 72, 81 and 82 in total are provided for each of the cells 6.

For the convenience of description, the first and second electrodes 71 and 72 viewable in the viewing direction 100 in FIG. 2 may be referred to as "front surface electrodes" and the third and fourth electrodes 81 and 82 on the side that can be viewed in a direction opposite to the viewing direction 100 may be referred to as "back surface electrodes." The front surface electrodes 71 and 72 define a first electrode section 70, and the back surface electrodes 81 and 82 define a second electrode section 80 that is opposite to the first electrode section 70 through the cells 6 in the viewing direction 100.

The substrate 3, the substrate 4, the cells 6, the electrodes 71, 72, 81 and 82 form an electrophoretic display 2 that functions as a display section of the electrophoretic display device 3 1. The electrophoretic display 2 conceptually includes an EPD panel or an EPD sheet, for example.

As the substrate 4 and the front surface electrodes 71 and 72 viewable in the viewing direction 100, a transparent substrate and transparent electrodes that transmit light in the wavelength region of visible light may be used, for allowing visual recognition of the interior of the cells that correspond to pixels.

As the material for the transparent substrate and for the transparent electrodes, any material substantially having conductivity can be used. Non-limiting examples of such conductive materials include metallic materials such as copper, aluminum, and alloys thereof; carbon materials such as carbon black; electron-conductive polymeric materials such as polyacetylene, polypyrrole, and derivatives thereof; ion-conductive polymeric materials prepared by dispersing an ionic material such as NaCl, $LiClO_4$, KCl, LiBr, $LiNO_3$, LiSCN or the like in a matrix resin such as polyvinyl alcohol, polycarbonate, polyethylene oxide or the like; and conductive oxide materials such as indium tin oxide (ITO), fluorine-doped tin oxide (FTO), tin oxide ($SnO_2$), and indium oxide (IO). These conductive materials may be used alone or in combinations of two or more materials. As a non-limiting embodiment example of the transparent electrode, PET/ITO sheet NXC1 manufactured by Toray Co., Ltd. may be used. It is noted that materials similar to the above may be used for the electrodes 81 and 82.

The back surface electrodes 81 and 82 may be formed on one surface of a circuit substrate 9. The circuit substrate 9 may also be provided with an electric circuit (illustration omitted) including, for example, thin film transistors (TFTs) that function as switching elements, a control circuit 91 that controls voltages to be applied to the electrodes 71, 72, 81 and 82, and the like. The control circuit 91 is electrically connected to the electrodes 71, 72, 81 and 82, respectively, and is capable of individually controlling the magnitude and the polarity (positive or negative) of each of the voltages to be applied.

The substrate 3, the substrate 4 and the partitions 30 have, for example, electrical insulation property and impermeability (retention property) against the dispersion liquid sealed inside the cells 6. The substrate 3, the substrate 4 and the partitions 30 may be formed from glass substrates, or flexible sheet members. By the use of flexible sheet members as the substrates 3 and 4, a freely deformable display section, such as, for example, an electronic paper can be obtained. As a material of the flexible sheet member, for example, polyolefin, liquid crystal polymer and thermoplastic elastomer, and copolymers, blends or polymer alloys mainly constituted of the above materials may be used. One or more of these materials may be used independently or in combination. The thickness of the sheet member can be arbitrarily set, while balancing between its flexibility and strength as an EPD, and may be about 20-500 μm, as an example without any particular limitation.

Configuration and Arrangement of Electrodes

The front surface electrodes 71 and 72 on the substrate 4 may be provided to correspond respectively to halved regions of an area of each of the cells 6 having a quadrilateral shape, as viewed in a plan in the viewing direction 100. Similarly, the back surface electrodes 81 and 82 on the substrate 3 may be provided to correspond respectively to halved regions of an area of each of the cells 6 having the quadrilateral shape, as viewed in a plan from the side of the circuit substrate 9. It is noted that a part or all of the areas (sizes) of the electrodes 71, 72, 81 and 82 may be mutually equal or different.

Figure 4:
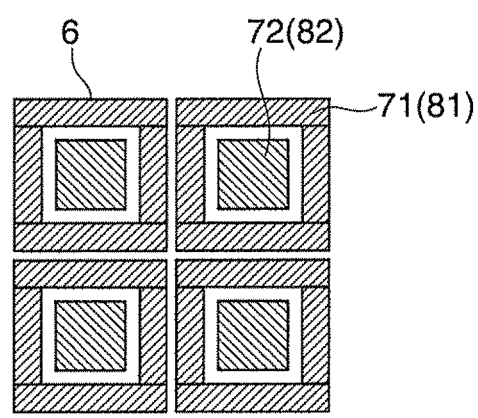
FIG. 4 is a plan view showing a modified example of the shape and arrangement of electrodes for each cell exemplified in FIG. 3.
Figure 5:
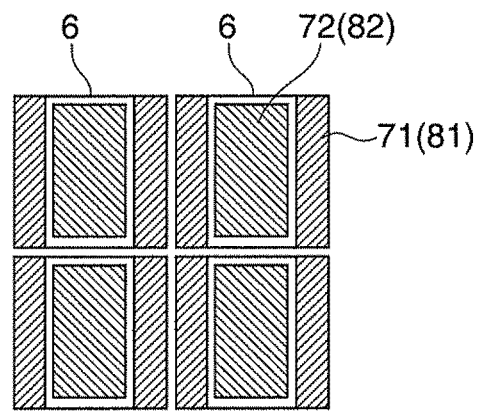
FIG. 5 is a plan view showing another modified example of the shape and arrangement of electrodes for each cell exemplified in FIG. 3.

The configuration and arrangement of the electrodes 71, 72, 81 and 82 are not limited to those shown in FIG. 3. For example, the configurations and arrangements shown in FIG. 4 and FIG. 5 may also be used. FIG. 4 and FIG. 5 are schematic views in part of the electrophoretic display device 1, both of which correspond to FIG. 3.

The example shown in FIG. 4 is provided with a front surface electrode 71 that extends in a ring shape along the peripheral region of the cell 6 as viewed in a plan in the viewing direction 100, and a front surface electrode 72 provided in a center area of the cell 6 surrounded by the front surface electrode 71 in the circular shape. Back surface electrodes 81 and 82 to be provided on the side of the substrate 3 may also have a configuration and an arrangement, for example, similar to those of the opposing front surface electrodes 71 and 72 across the cell 6. Specifically, as the electrophoretic display 2 is viewed from the side of the circuit substrate 9, the back surface electrode 81 may be provided along the peripheral region of the cell 6, and the back surface electrode 82 may be provided in a center area of the cell 6 surrounded by the electrode 81 in the circular shape. However, the electrode 71 and the electrode 81 (the electrode 72 and the electrode 82) may not have to be identical to each other in configuration and arrangement.

The example shown in FIG. 5 is provided with strips of front surface electrode 71, each having a constant width, extending along two opposing sides of a rectangular cell 6 as viewed in a plane in the viewing direction 100, and a strip of front surface electrode 72 having a constant width and extending in parallel with the electrodes 71 provided in an area between the electrodes 71. Back surface electrodes 81 and 82 to be provided on the side of the substrate 3 may also have a configuration and an arrangement similar to those of the front surface electrodes 71 and 72. The width (area) of the electrode 72 (82) may be set to be greater than the width (area) of the electrode 71 (81) as exemplified in FIG. 5. However, they can be set without any particular limitation to the above.

In any of the example cases shown in FIG. 3, FIG. 4 and FIG. 5, the front surface electrodes 71 and 72 as well as the back surface electrodes 81 and 82 are mutually spatially separated, thereby being electrically insulated from each other, and application of voltage to each of the electrodes 71, 72, 81 and 82 is individually (independently) controlled by the control circuit 91. The voltage control includes controlling of the magnitude and the polarity (positive or negative) of each application voltage.

By controlling the magnitude of the application voltage, electrophoretic speed of the electrophoretic particles within the cells 6 shown in FIG. 2 can be controlled. By controlling the polarity of the application voltage, the electrophoretic particles within the cells 6 may be locally gathered to the side of the substrate 4 that is the viewing side, or locally gathered to the side of the substrate 3 that is a side opposite to the viewing side.

Furthermore, with the electrode configuration and arrangement exemplified in each of FIG. 3, FIG. 4 and FIG. 5, the pattern of polarities of voltages (positive and negative voltages) to be applied to each of the electrodes 71, 72, 81 and 82 is controlled, whereby the electrophoretic path of the electrophoretic particles may be locally shifted to different regions within the cells 6 according to the polarity (positive or negative charge) of the electrophoretic particles.

Dispersion Liquid

Next, the dispersion liquid 5 sealed in the cells 6 will be described.

Each of the cells 6 shown in FIG. 6 is filled with a solution (dispersion liquid) 5 in which electrophoretic particles (5A-5C in the example shown in FIG. 2) are dispersed (suspended) in a predetermined solvent (dispersion medium) and sealed. As a method of filling the dispersion liquid 5 in the cells 6 (the recesses 13), various coating methods, for example, a dipping method of dipping the substrate 3 having the recesses 13 in the dispersion liquid 5, a dripping method using a disperser, an ink jet method (a droplet ejection method), a spin coat method, a dip coat method, a spray coat method and the like may be used. The use of a dripping method or an ink jet method allows selective supply of the dispersion liquid 5 to target cells 6. Therefore, the dispersion liquid 6 can be reliably supplied in the cells 6 without any wastes. It is noted that the direction in which the dispersion liquid 5 is supplied to each of the cells 6 is not necessarily limited to the vertical downward direction, and may be sideway or in a vertical upward direction.

As the dispersing medium, for example, it is possible to use ellosolves such as methyl cellosolve; esters such as methyl acetate; ketones such as acetone; aliphatic hydrocarbons (liquid paraffins) such as pentane; alicyclic hydrocarbons such as cyclohexane; aromatic hydrocarbons such as benzene; halogenated hydrocarbons such as methylene chloride; aromatic heterocycles such as pyridine; nitrites such as acetonitrile; amides such as N,N-dimethylformamide; carboxylic salts; various kinds of oils; and the like. One or more of them may be used independently or in combination.

Above all, a dispersion medium made of aliphatic hydrocarbons (liquid paraffin) as the principal component is preferable. The dispersion medium primarily containing liquid paraffin is preferable since it has high aggregation suppressing effect on the electrophoretic particles, and relatively low affinity (low solubility) to the constituent material of the cells 6. Accordingly, the display performance of the EPD can be more securely prevented or suppressed from deteriorating in aging. Further, liquid paraffin is preferable also in view of the fact that it has excellent weather-resistant property because it does not include unsaturated bonds, and is highly safe.

Further, if necessary, various kinds of additives may be added to the dispersion medium. For example, it is possible to add a surfactant (anionic or cationic surfactant) such as electrolyte, alkenyl succinate or the like; a charge-controlling agent composed of particles of a metal soap, a resin material, a rubber material, an oil, a varnish or a compound; a dispersion agent such as a silane-based coupling agent; a lubricating agent; a stabilizing agent; and the like.

Further, when the dispersion medium is to be colored, depending on the necessity, a pigment, such as, an anthraquinone-based pigment, an azo-based pigment, an indigoid-based pigment or the like may be dissolved in the dispersion medium.

Above all, if the dispersion liquids 5 with different compositions are selectively supplied to the cells 6 by a dispenser or the like, hydrocarbon medium having high viscosity, such as, Isopar M, Isopar G and the like may be suitable.

Electrophoretic Particles

Plural kinds of electrophoretic particles may be contained in the dispersion liquid 5. FIG. 2 shows a state in which three kinds of particles 5A, 5B and 5C are contained in the dispersion liquid 5.

As the particles 5A-5C described above, for example, at least one type of pigment particles, resin particles and composite particles thereof may preferably be used.

As a pigment of which the pigment particles are made, for example, it is possible to use: a black pigment such as aniline black or carbon black; a white pigment such as titanium oxide or antimony oxide; an azo-based pigment such as monoazo, disazo or polyazo; a yellow pigment such as isoindolinone, chrome yellow or iron oxide yellow; a red pigment such as quinacridone red or chrome vermilion; a blue pigment such as phthalocyanine blue or indanthrene blue; a green pigment such as phthalocyanine green; and the like. One or a combination of two or more of these pigments may be used.

For example, it is possible to use Carbon Black, Spirit Black, Lamp Black (C.I. No. 77266), Magnetite, Titanium Black, Chrome Yellow, Cadmium Yellow, Mineral Fast Yellow, Navel Yellow, Naphthol Yellow S, Hansa Yellow G, Permanent Yellow NCG, Chrome Yellow, Benzidine Yellow, Quinoline Yellow, Tartrazine Lake, Chrome Orange, Molybdenum Orange, Permanent Orange GTR, Pyrazolone Orange, Benzidine Orange G, Cadmium Red, Permanent Red 4R, Watching Red Calcium Salt, Eosine Lake, Brilliant Carmine 3B, Manganese Violet, Fast Violet B, Methyl Violet Lake, Prussian Blue, Cobalt Blue, Alkali Blue Lake, Victoria Blue Lake, Fast Sky Blue, Indanthrene Blue BC, Ultramarine Blue, Aniline Blue, Phthalocyanine Blue, Chalco Oil Blue, Chrome Green, Chromium Oxide, Pigment Green B, Malachite Green Lake, Phthalocyanine Green, Final Yellow Green G, Rhodamine 6G, Quinacridone, Rose Bengal (C.I. No. 45432), C.I. Direct Red 1, C.I. Direct Red 4, C.I. Acid Red 1, C.I. Basic Red 1, C.I. Mordant Red 30, C.I. Pigment Red 48:1, C.I. Pigment Red 57:1, C.I. Pigment Red 122, C.I.

Pigment Red 184, C.I. Direct Blue 1, C.I. Direct Blue 2, C.I. Acid Blue 9, C.I. Acid Blue 15, C.I. Basic Blue 3, C.I. Basic Blue 5, C.I. Mordant Blue 7, C.I. Pigment Blue 15:1, C.I. Pigment Blue 15:3, C.I. Pigment Blue 5:1, C.I. Direct Green 6, C.I. Basic Green 4, C.I. Basic Green 6, C.I. Pigment Yellow 17, C.I. Pigment Yellow 93, C.I. Pigment Yellow 97, C.I. Pigment Yellow 12, C.I. Pigment Yellow 180, C.I. Pigment Yellow 162, and Nigrosine dye (C.I. No. 50415B); metal oxides such as metal complex dyes, silica, aluminum oxide, magnetite, maghemite, various kinds of ferrites, cupric oxide, nickel oxide, zinc oxide, zirconium oxide, titanium oxide, magnesium oxide, and the like; and magnetic materials including magnetic metals such as Fe, Co, and Ni; and the like. The foregoing materials can be used alone or in combination of two or more of them.

Also, as a resin material that composes the resin particles, for examples, acryl-based resin, urethane-based resin, urea-based resin, epoxy-based resin, polystyrene, polyester and the like can be enumerated. One or a combination of two or more of these resin materials may be used. As the composite particles, for example, particles produced by coating surfaces of the pigment particles with the resin material or other pigment; particles produced by coating surfaces of the resin particles with the pigment; and particles made of a mixture obtained by mixing the pigment and the resin material in a suitable composition ratio can be enumerated. The aforementioned particles are advantageous because they can be readily manufactured, and their charge can be relatively easily controlled.

As the particles produced by coating the surfaces of the pigment particles with the other pigment, for example, particles obtained by coating surfaces of titanium oxide particles with silicon oxide or aluminum oxide can be exemplified. These particles may be used as white particles. Also, carbon black particles or particles produced by coating surfaces thereof may be used as color particles (black particles).

For the purpose of improving dispersibility of the particles 5A-5C in the dispersion medium 5, a polymer having high affinity to the dispersion medium can be physically adsorbed or chemically bonded to the surfaces of the particles 5A-5C. Among these, from the point of view of eliminating or bonding of the polymer from or to the surfaces of the first particles, respectively, it is preferred that the polymer is chemically bonded to the surfaces of the particles. Due to such bonding, an apparent specific gravity of the particles 5A-5C work in a reducing direction, whereby it is possible to improve affinity, in other words, dispersibility of the particles 5A-5C to the dispersion medium. The particles 5C may have better dispersability in the dispersion liquid 5, compared to the charged particles 5A and 5B. This can prevent the particles 5C from getting mutually aggregated and settling in the dispersion liquid 5. As a result, generation of color irregularities in a color display state can be prevented, whereby the color display characteristics can be improved.

Examples of such a polymer include: a polymer which has groups reacting with the electrophoretic particles and functional groups having charge property; a polymer which has groups reacting with the electrophoretic particles and long alkyl chains, long ethylene oxide chains, long alkyl fluoride chains, or long dimethyl silicone chains; a polymer which has groups reacting with the electrophoretic particles, functional groups having charge property, and long alkyl chains, long ethylene oxide chains, long alkyl fluoride chains, or long dimethyl silicone chains; and the like.

Among the polymers described above, examples of the groups reacting with the particles 5A-5C (hereinafter, referred to as "reactive groups") include epoxy groups, thioepoxy groups, alkoxysilane groups, silanol groups, alkylamido groups, aziridine groups, oxazin groups, isocyanate groups, and the like. One or more of these reactive groups may be used independently or in combination. These reactive groups may be appropriately selected depending on the kinds of the particles 5A-5C.

The average particle size of the electrophoretic particles 5A-5C may be appropriately selected in a range that provides sufficient hiding ratio (display contrast) in a visible light region, but does not deteriorate the display quality due to facilitated sedimentation of the particles 5A-5C. The average particle size of the electrophoretic particles 5A-5C that satisfies such a range as described above may be between about 0.1 μm and about 10 μm, without any particular limitation to this range.

Moreover, the particles 5A and 5B may be charged particles having mutually opposite (positive and negative) polarities. For example, the particles 5A may be positively charged particles that are electrically charged in positive polarity (+), and the particles 5B may be negatively charged particles that are electrically charged in negative polarity (−).

In contrast, each of the particles 5C may be a very weakly charged particle having a sufficiently lower electrical charge than that of each of the particles 5A and 5B, or an electrically non-charged particle that does not substantially have a polarity. In this case, the particles 5C may not be influenced or may be difficult to be influenced by electric fields applied by the electrodes 71, 72, 81 and 82, such that the particles 5C have a tendency to evenly disperse in the dispersion liquid 5. In other words, the location of the particles 5C within the cells can be controlled relatively in association with the electrophoretic control of the particles 5A and 5B. It is noted that, when the particles 5C are very weakly charged particles, the polarity of the particles 5C may be in the same polarity of one of the particles 5A and 5B.

The positively charged particles 5A are particles having a positive charge, and therefore move by electrophoresis toward any of the four electrodes 71, 72, 81 and 82 to which a negative potential is applied in a manner to be adsorbed (adhered) thereto. In contrast, the negatively charged particles 5B are particles having a negative charge, and therefore move by electrophoresis toward any of the four electrodes 71, 72, 81 and 82 to which a positive potential is applied in a manner to be adsorbed thereto.

Therefore, by controlling patterns of the polarities of voltages to be applied to the electrodes 71, 72, 81 and 82, the charged particles 5A and 5B can be locally gathered in regions (spaces) in the cell 6 corresponding to appropriate ones of the four electrodes 71, 72, 81 and 82.

In this manner, the electrophoretic display device 1 is capable of changing the color (hereafter also referred to as the "display color") within the cell 6 viewed in the viewing direction 100. Also, by controlling the pattern of voltage polarities, the electrophoretic paths within the cell 6 of the particles 5A and 5B that are charged in mutually opposite polarities (positive and negative polarities) can be individually controlled. Accordingly, when switching the display color, the charged particles 5A and 5b may be electrophoretically moved in mutually different paths between the substrate 3 and the substrate 4, such that the probability of mutual adhesion (coupling) can be reduced.

Combinations of Colors

The particles 5A-5C within each of the cells 6 may be in different colors. The colors of the particles 5A-5C may be arbitrarily selected from among, for example, achromatic colors such as white (W), black and their halftone (gray), and chromatic colors such as three primary colors of red (R), green (G) and blue (B) in additive color mixing, and three primary colors of cyan (Cy), magenta (Ma) and yellow (Ye) in subtractive color mixing.

For example, it is possible to use a combination in which one of R, G and B is assigned to the particles 5A, and one of cyan (Cy), magenta (Ma) and yellow (Ye) respectively corresponding to complementary colors of R, G and B may be assigned to the particles 5B. Conversely, it is also possible to use a combination in which one of cyan (Cy), magenta (Ma) and yellow (Ye) is assigned to the particles 5A, and one of R, G and B is assigned to the particles 5B.

In other words, the cell 6 (the dispersion liquid 5) may be composed of a combination of "white particles 5C+color particles 5A+particles 5B of a complementary color to the color particles 5A+colorless solvent." It is noted that the color particles 5A is an example of a first color substance corresponding to one of three primary colors in additive color mixing, and the particles 5B is an example of a second color substance in complementary color relation with respect to the first color substance.

For example, in the first cell 6, when the "color particles 5A" are red (R) particles, complementary color particles of the red particles are cyan (Cy) particles. Therefore the dispersion liquid 5 containing white (W) particles, red particles, cyan particles and colorless solvent is sealed in the first cell 6. In the second cell 6, when the "color particles 5A" are green (G) particles, complementary color particles of the green particles are magenta (Ma) particles. Therefore the dispersion liquid 5 containing white particles, green particles, magenta particles and colorless solvent is sealed in the second cell 6. Similarly, in the third cell 6, when the "color particles 5A" are blue (B) particles, complementary color particles of the blue particles are yellow (Ye) particles. Therefore the dispersion liquid 5 containing white particles, blue particles, yellow particles and colorless solvent is sealed in the third cell 6. It is noted that the "color substance" is used to refer to color particles in a specified color, and also conceptually include color solvent in that color as shown in modified examples to be described below.

Figure 6C:
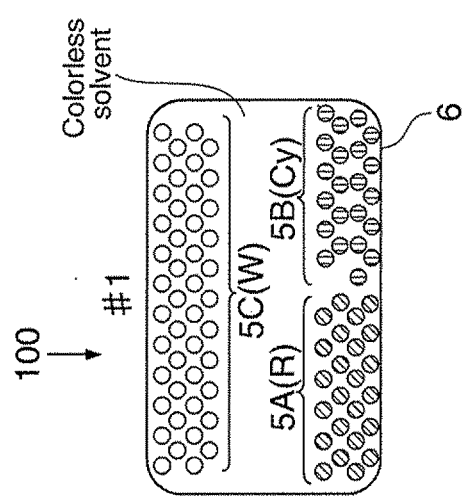
FIGS. 6A-6C are partial cross-sectional views schematically showing examples of combinations of color particles in each of the cells.
Figure 6B:
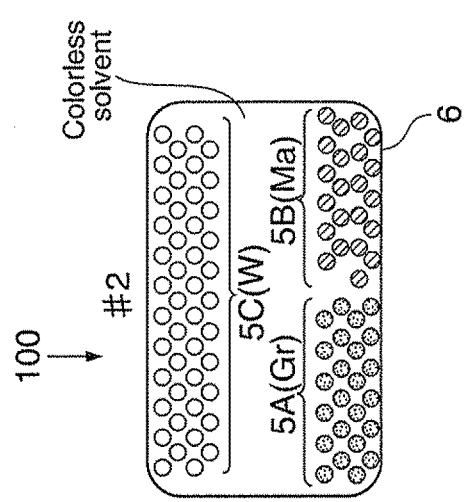
Figure 6A:
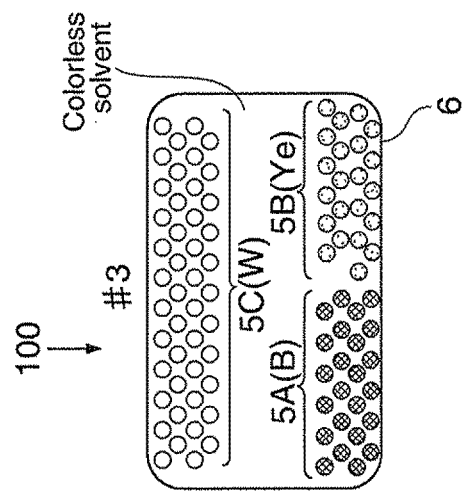

In summary, as the dispersion liquid 5 in the cell 6, as exemplified in FIGS. 6A-6C and Table 1 below, any of three types of compositions (combinations) #1-#3 can be selected. Color combinations of the particles 5A-5C in the cells 6 with these three types of compositions #1-#3 that can be viewed in the viewing direction 100 are controlled, whereby a full color display can be performed by the electrophoretic display 2.

TABLE 1

Composition Examples of Dispersion Liquid 5

| | Color Particles 5A | Complementary color particles 5B | Particles 5C | Solvent |
|---|---|---|---|---|
| Composition #1 | Red (R) | Cyan (Cy) | White (W) | Colorless |
| Composition #2 | Green (G) | Magenta (Ma) | White (W) | Colorless |
| Composition #3 | Blue (B) | Yellow (Ye) | White (W) | Colorless |

For example, one of the cells 6 with one composition #i (i=1, 2 or 3) is controlled to display a single color of the color particles 5A with one of the primary colors (red, green or blue), and the cells 6 with the remaining two compositions #j=1, 2 or 3, and j≠i) are controlled to display a single color with the color particles 5B of two of the colors of complementary color system (cyan, magenta and yellow) that are different from the complementary color of the color particles 5A. Alternatively, one of the cells 6 with one composition #i is controlled to display a single color with the color particles 5B of one color in complementary color system (cyan, magenta or yellow), and the cells 6 with the remaining two compositions #j are controlled to display a single color with the color particles 5A of two of the colors in primary color system (red, green and blue).

In either of the cases, the display color for two cells (two pixels) with the composition #j is equivalent to displaying one color in primary color system or complementary color system that is displayed by the cell 6 with the composition #i. Accordingly, one of the primary colors in additive color mixing (red, green and blue) or one of the primary colors in subtractive color mixing (cyan, magenta and yellow) can be displayed the by three pixels.

Figure 8C:
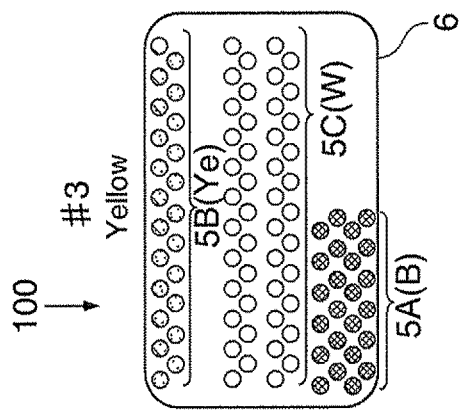
FIGS. 8A-8C are schematic partial cross-sectional views explaining display states of three of the cells of the electrophoretic display device shown in FIG. 1 and FIG. 2.
Figure 8B:
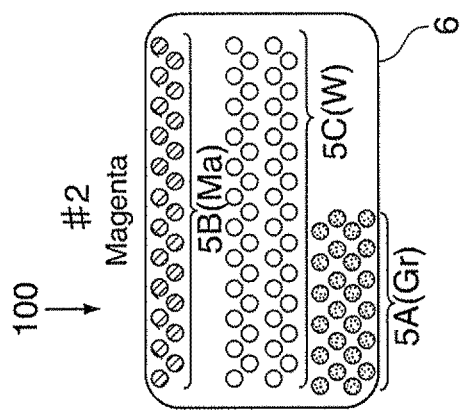
Figure 8A:
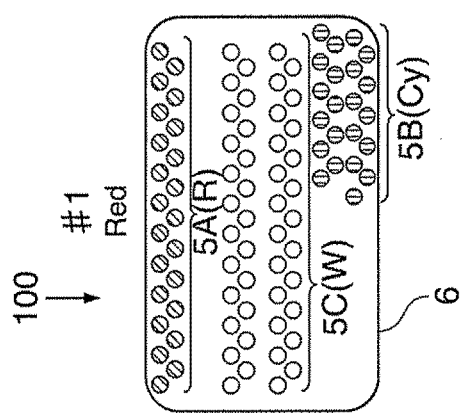

One example is schematically shown in FIG. 8A-8C, wherein the cell 6 with the composition #1 is controlled to display red with the red particles 5A, the cell 6 with the composition #2 is controlled to display magenta with the magenta particles 5B, and the cell 6 with the composition #3 is controlled to display yellow with the yellow particles 5B. In this instance, a mixed color of magenta and yellow is equivalent to displaying a red color due to the color mixing as observed in the viewing direction 100.

Accordingly, the red color can be displayed with the three cells 6, in other words, using color areas for three pixels. As to the other colors, each target color can also be displayed in a similar manner with color areas for three pixels. Table 2 below shows examples of combinations of display colors of the three cells 6 (#1-#3) when displaying any of eight colors as single display colors of white (W), red (R), green (G), blue (B), cyan (Cy), magenta (Ma), yellow (Ye) and black

TABLE 2

Examples of Combinations of Display Colors

| Display Color | Present Embodiment | | | Comparison Example | | |
|---|---|---|---|---|---|---|
| | Cell #1 | Cell #2 | Cell #3 | Cell #1 | Cell #2 | Cell #3 |
| W | W | W | W | W | W | W |
| R | R | Ma | Ye | R | W or K | W or K |
| G | Cy | G | Ye | W or K | G | W or K |
| B | Cy | Ma | B | W or K | W or K | B |
| Cy | Cy | G | B | W or K | G | B |
| Ma | R | Ma | B | R | W or K | B |
| Ye | Ma | Cy | Ye | R | G | W or K |
| K | R + Cy | G + Ma | B + Ye | R | G | B |

The comparison example shown in Table 2 indicates a case in which three cells contain color pigments with color combinations of (R, W, K), (G, W, and (B, W, K), respectively, and shows combinations of display colors of the cells when displaying the same eight colors using the three cells.

Figure 9C:
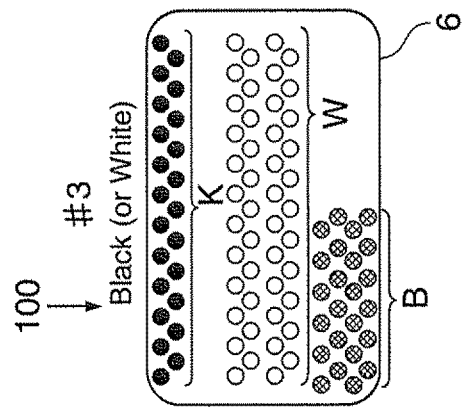
FIGS. 9A-9C are schematic partial cross-sectional views explaining display states of three of the cells of related art.
Figure 9B:
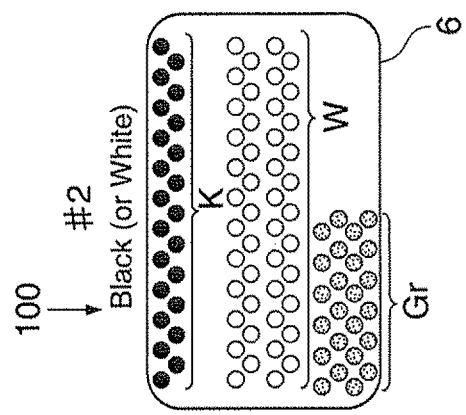
Figure 9A:
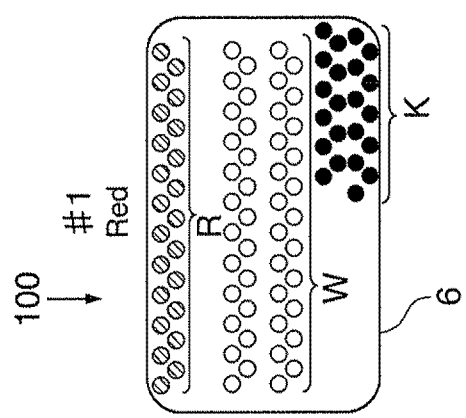

According to the comparison example, when displaying one of the colors R, G and B, one of the three cells #1-#3 displays the target display color R, G or B, and the other two cells display achromatic color (W or K). Accordingly, the rate of the pixel area that is actually displaying the target display color is reduced to 1/3. FIGS. 9A-9C schematically show an example of the display states of the three cells when displaying red in accordance with the comparison example. As shown in FIGS. 9A-9C, two of the cells display black, and red is displayed only by one of the cells.

In contrast, in accordance with the present embodiment example, one of the three cells 6 displays one color with specified color particles of that one color, and two of the cells 6 display a color with color particles of two colors, which are different from color particles in complementary color relation with the specified color particles. Accordingly, the area rate of the pixels displaying each of the target display colors (red, green, blue, cyan, magenta and yellow) can be made to be 100%, whereby the efficiency in displaying a single color and its chroma can be improved.

When performing a white color display, all of the three cells #1-#3 may display white with the white particles. Each of the cells for three pixels is capable of displaying white with the white particles, such that a reduction in the reflectance in white display can be suppressed to the minimum, and therefore a whiter white color with a higher brightness level (ideally pure white) can be expressed.

When performing a black color display, each of the three cells #1-#3 may be set in a state of simultaneously displaying one of the R, G and B color particles, respectively, and one of the cyan, magenta and yellow color particles, respectively. In other words, when the first cell #1 is controlled to have a display state of displaying with the color particles 5A together with the color particles 5B, the second and third cells #2 and #3 are controlled to have a display state of displaying with the color particles 5B together with the color particles 5A.

In this case, each of the three cells 6 displays a mixed color of the color particles 5A and 5B, whereby a black color is presented with a mixed color of the six colors, R, G, B, cyan, magenta and yellow. This makes it possible to improve the absorption rate in black display compared to the case where a black color is displayed with a mixed color of the three colors of R, G and B or the three colors of cyan, magenta and yellow, whereby a blacker black color with lower brightness level can be expressed.

The display color control on the three cells 6 described above can be achieved by individually controlling the polarities of voltages to be applied to the four electrodes 71, 72, 81 and 82 on each of the cells 6, in other words, by controlling patterns of the voltage polarities. Table 3 below shows examples of patterns of the polarities of voltages to be applied to the respective electrodes 71, 72, 81 and 82, for displaying the eight colors using the three cells #1-#3, respectively.

in Table 3. It is assumed here that a pair of the electrodes X1 and X3 can assume two states of positive polarity (+) and ground (g), and a pair of the electrodes X2 and X4 can assume two states of negative polarity (−) and ground (g).

The control circuit 91 shown in FIG. 2 described above controls the polarities of the individual electrodes X1, X2, X3 and X4 based on electrode polarity patterns exemplified in Table 3, whereby the efficiency in displaying a single color and its chroma can be improved. Information of the voltage polarity patterns described above may be stored in a memory (illustration omitted) in the control circuit 91 as data in a table format or the like.

Figure 14:
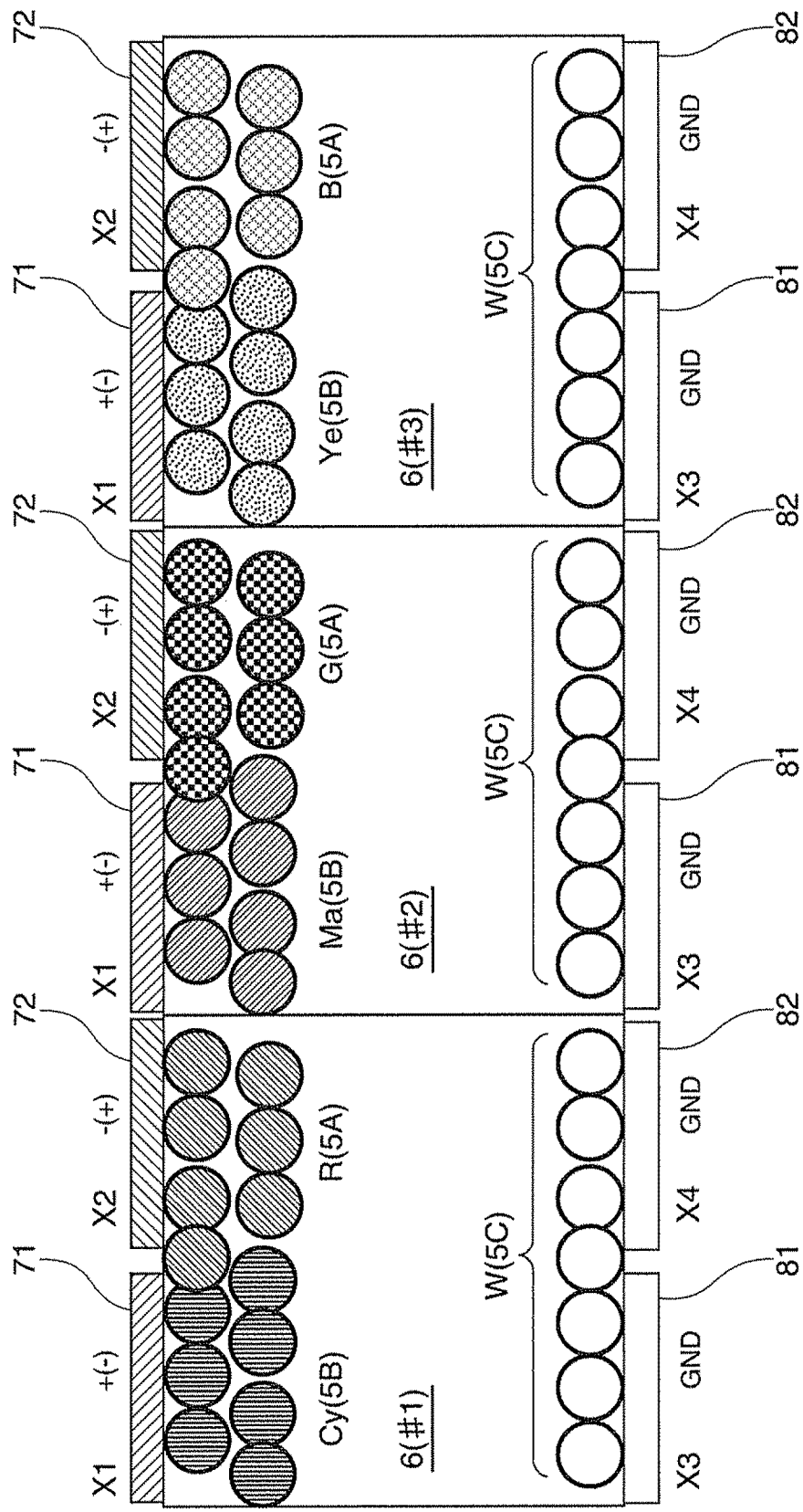
FIG. 14 is a schematic partial cross-sectional view showing an example of displaying black with the electrode arrangement (four-electrode structure) exemplified in FIG. 7.

For example, when displaying a black color (K) with the three cells #1, #2 and #3, the control circuit 91 controls each of the cells #i in a manner, as exemplified in a schematic partial cross-sectional view in FIG. 14, that the front surface electrodes X1 and X2 have mutually opposite polarities, while the back surface electrodes X3 and X4 are in a grounded state. By this, two types of the particles in each cell, namely, the Cy particles and the R particles in the cell #1, the Ma particles and the G particles in the cell #2, and the Ye particles and the B particles in the cell #3 are drawn to the side of the front surface electrodes X1 and X2. As a result, the white particles become locally gathered, relatively, to the back surface electrodes X3 and X4 in each of the cells #1, #2 and #3. Therefore, as described above, the absorption rate in black display can be improved, compared to the case where a black color is displayed with a mixed color of the three colors of R, G and B, or a mixed color of the three colors of cyan, magenta and yellow, whereby a blacker black color with a lower brightness level can be expressed.

It is noted that the voltage polarity patterns shown in Table 3 are merely example, and can be appropriately modified, as long as the combinations of display colors exemplified in Table 2 are possible. For example, the control circuit 91 may control such that one of the electrodes X1 and X2 (or the electrodes X3 and X4) is in a positive polarity or a negative polarity at a certain timing T1 (T is a positive real number), and the other electrode is in a grounded state, and the elec-

TABLE 3

Examples of Patterns of Voltage Polarity

| Display Color | Cell #1 | Cell #2 | Cell #3 | Electrode Polarity Cell #1 | | | | Electrode Polarity Cell #2 | | | | Electrode Polarity Cell #3 | | | |
|---|---|---|---|---|---|---|---|---|---|---|---|---|---|---|---|
| | | | | X1 | X2 | X3 | X4 | X1 | X2 | X3 | X4 | X1 | X2 | X3 | X4 |
| W | W | W | W | g | g | + | − | g | g | + | − | g | g | + | − |
| R | R | Ma | Ye | g | − | + | g | + | g | g | − | + | g | g | − |
| G | Cy | G | Ye | + | g | g | − | g | − | + | g | + | g | g | − |
| B | Cy | Ma | B | + | g | g | − | + | g | g | − | g | − | + | g |
| Cy | Cy | G | B | + | g | g | − | g | − | + | g | g | − | + | g |
| Ma | R | Ma | B | g | − | + | g | + | g | g | − | g | − | + | g |
| Ye | R | G | Ye | g | − | + | g | g | − | + | g | + | g | g | − |
| K | R + Cy | G + Ma | B + Ye | + | − | g | g | + | − | g | g | + | − | g | g |

Figure 7:
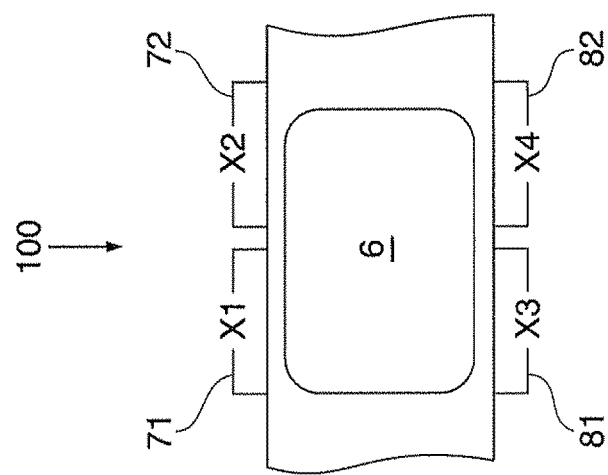
FIG. 7 is a schematic partial cross-sectional view showing an example of electrode arrangement for one cell exemplified in FIG. 3.

It is noted that the color particles 5A and 5B are electrically charged with mutually opposite (positive and negative) polarities so that locally gathered regions and electrophoretic paths of the color particles 5A and 5B in the cells 6 can be individually controlled. For example, it is assumed that the color particles 5A with one of R, G and B colors are positively charged, and the complementary color particles 5B with one of cyan, magenta and yellow colors are negatively charged. Also, as schematically shown in FIG. 7, the electrodes 71, 72, 81 and 82 are appended with X1, X2, X3 and X4, respectively, trode in the grounded state changes to a positive polarity or a negative polarity at a later timing T2 (>T1). In other words, one of the electrodes X1 and X2 (or the electrodes X3 and X4) may be controlled to have a positive polarity or a negative polarity, and then both of the electrodes may be controlled to have the same positive or negative polarity. This makes it possible to perform such a control that the color particles 5A or 5B are once locally gathered adjacent to the electrode with the negative or positive polarity, and then dispersed adjacent to the electrodes X1 and X2 (or the electrodes X3 and X4).

Also, the control circuit 91 may control the polarities and/or magnitudes of voltages to be applied to the electrodes X1-X4, whereby the distance between the color particles 5A and 5B in the cells 6 and the substrate 4 on the viewing side (see FIG. 2) can be controlled. By such a control, the electrophoretic display device 1 (the electrophoretic display 2) can also display halftones.

Figure 15:
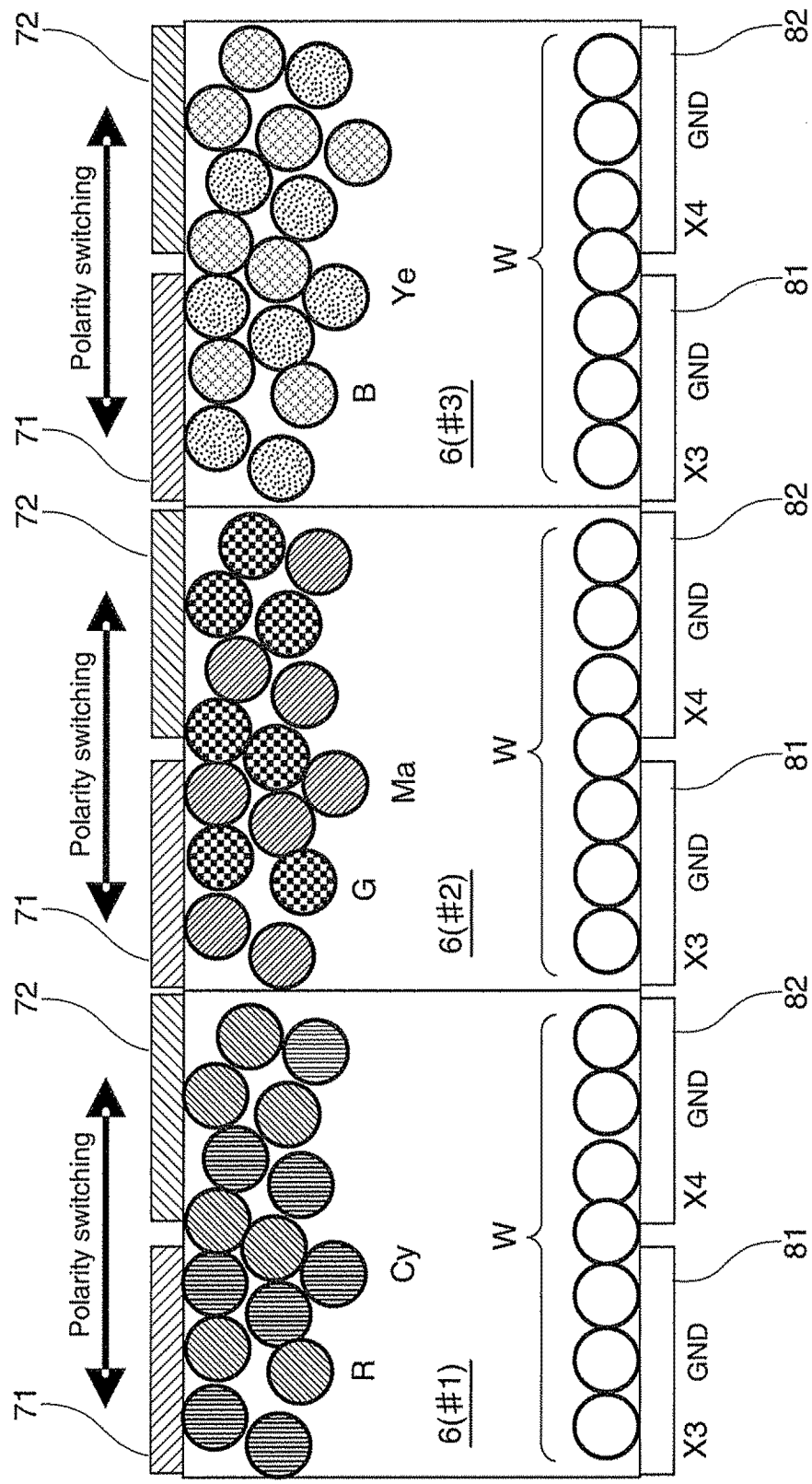
FIG. 15 is a schematic partial cross-sectional view showing a modified example of the electrode polarity control in black display exemplified in FIG. 14.

Also, in the case of displaying a black color with the three cells #i as exemplified in FIG. 14, the control circuit 91 may control the front surface electrodes X1 and X2 to have mutually opposite polarities, and then switch the polarities of the front surface electrodes X1 and X2 with each other at least once within a specified period of time. By switching the polarities, alternate electric fields are generated near the viewing side of the cells #i, whereby the white particles 5A and 5B drawn closer to the front surface electrodes X1 and X2 at the viewing side can be mixed together, for example, as shown in a schematic partial cross-sectional view in FIG. 15. As a result, local gathering or uneven distribution of the white particles 5A and 5B can be cancelled or alleviated, such that the reflectance in black display can be reduced, and the chroma in black display can be made lower. Accordingly, a blacker black can be expressed.

2. Modified Example 2.1. Other Compositions of Dispersion Liquid 5

In the embodiment described above, the composition example of the dispersion liquid 5 composed of "white particles 5C+color particles 5A+color particles 5B complementary to the color particles 5A+colorless solvent" has been described as an example. In addition, as another composition example of the dispersion liquid 5, it is possible to use a combination of "white particles 5C+color particles 5A+color solvent complementary to the color particles 5A" or a combination of "white solvent+color particles 5A+color particles 5B complementary to the color particles 5A."

In other words, one of the three primary colors (R, G and B), the complementary colors (cyan, magenta and yellow) and a white color to be realized at each one of the cells 6 may be achieved by the color particles described above as examples of the "color substance," or by color solvent as another example of the "color substance."

In the case of the combination of "white particles 5C+color particles 5A+color solvent complementary to the color particles 5A," the white particles 5C and the color particles 5A may be electrically charged with mutually opposite (positive and negative) polarities. By appropriately controlling voltage polarity patterns with the combination described above, the electrophoresis of the white particles 5C and the color particles 5A can be individually controlled, and the combinations of display colors by the three cells 6 described above can be realized.

In the case of the combination of "white solvent+white particles 5A+color particles 5B complementary to the color particles 5A," the color particles 5A and 5B may be composed of particles with mutually opposite (positive and negative) polarities, and the white solvent may be a very weakly charged solvent. This allows application of controls similar to the control of voltage polarity patterns described above. Accordingly, by individually controlling the electrophoresis of the color particles 5A and 5B that are electrically charged with mutually opposite (positive and negative) polarities, the combinations of display colors by the three cells 6 described above can be realized.

2.2. Other Embodiments of Electrode Arrangement and Electrode Polarity Control

The embodiments described above show examples in which four electrodes 71, 72, 81 and 82 are provided for each one of the cells 6. However, there are cases that can be satisfied with two or three electrodes on each one of the cells 6.

2.2.1. Two-Electrode Structure

For example, one front surface electrode and one back surface electrode may be arranged on each of the cells 6 (such an arrangement may be hereafter referred to as a "two-electrode structure"), whereby each of the cells 6 can be individually controlled to display a color with either first color substance (for example, color particles 5A) or second color substance (for example, complementary color particles 5B).

Figure 10:
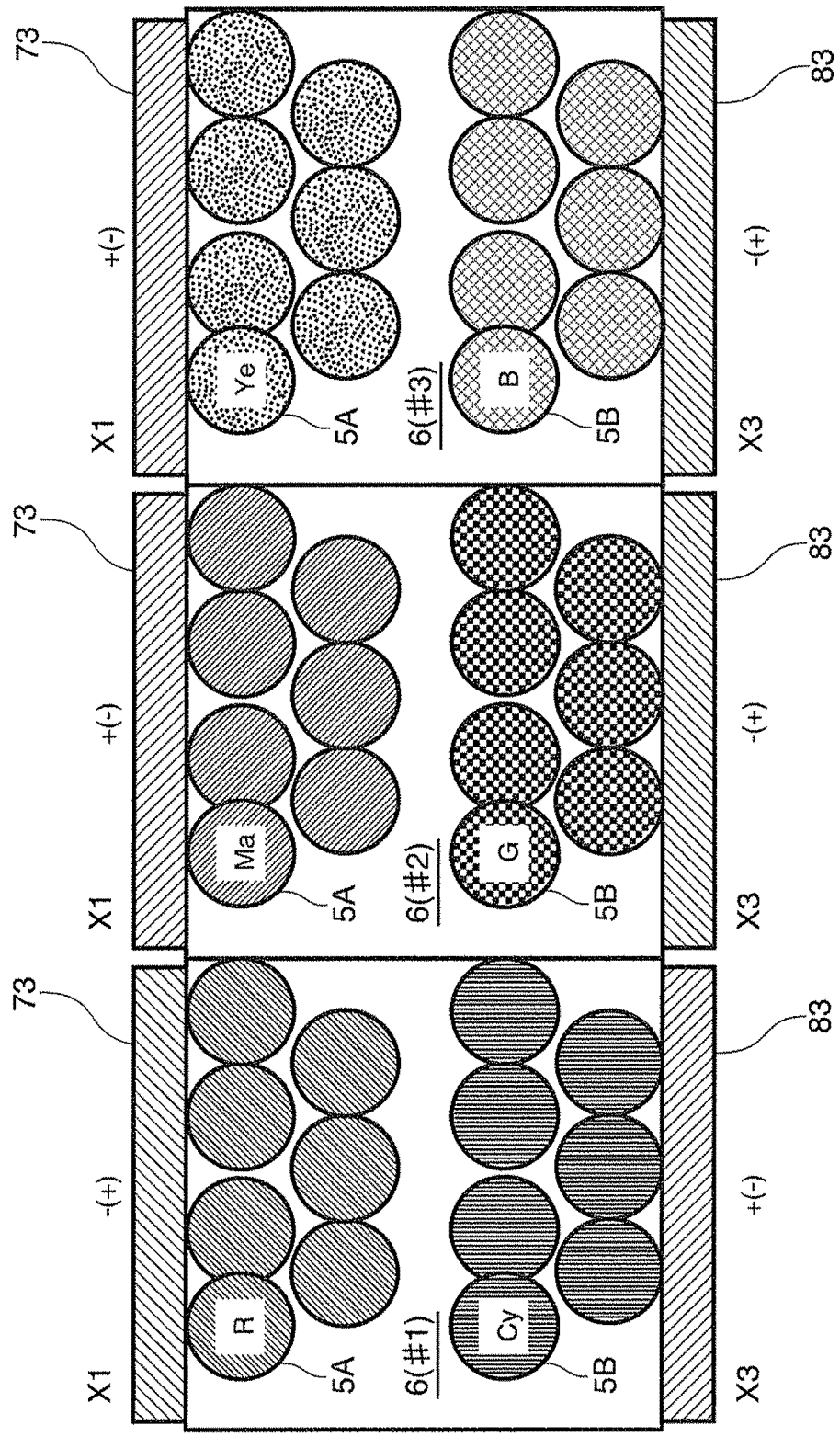
FIG. 10 is a schematic partial cross-sectional view showing another example of the electrode arrangement for three of the cells of the electrophoretic display device exemplified in FIG. 1 and FIG. 2 and its electrode polarity control in accordance with another embodiment, where a red color is displayed with a two-electrode structure.

One example of the two-electrode structure is shown in a schematic partial cross-sectional view in FIG. 10. FIG. 10 exemplifies a state in which one front surface electrode 73 and one back surface electrode 83 are provided on each of three cells 6 that are appended with #1, #2 and #3.

The cell #1 contains two types of particles, red (R) and cyan (Cy) particles, the cell #2 contains two types of particles, G and Ma particles, and the cell #3 contains two types of particles, B and Ye particles. Also, the three types of particles of R, G and B, and the three types of particles of Cy, Ma and G are electrically charged with mutually opposite polarities. Therefore, if the three types of particles of R, G and B are negatively charged, the three types of particles of Cy, Ma and G are positively charged, and their relation can be reversed.

The polarity (positive or negative polarity) of each of the front surface electrode 73 and the back surface electrode 83 can be individually controlled by the control circuit 91 described above. Table 4 below shows examples of patterns of the polarities of voltages to be applied to the front surface electrode 73 (X1) and the back surface electrode 83 (X3) by the control circuit 91, for displaying one of red (R), green (G), blue (B), cyan (Cy), magenta (Ma), yellow (Ye) and black (K) using the three cells #1, #2 and #3.

TABLE 4

Examples of Patterns of Voltage Polarity

| Display Color | Cell #1 | Cell #2 | Cell #3 | Electrode Polarity X1 X3 Cell #1 | | Electrode Polarity X1 X3 Cell #2 | | Electrode Polarity X1 X3 Cell #3 | |
|---|---|---|---|---|---|---|---|---|---|
| R | R | Ma | Ye | − | + | + | − | + | − |
| G | Cy | G | Ye | + | − | − | + | + | − |
| B | Cy | Ma | B | + | − | + | − | − | + |
| Cy | Cy | G | B | + | − | − | + | − | + |
| Ma | R | Ma | B | − | + | + | − | − | + |
| Ye | R | G | Ye | − | + | − | + | + | − |
| K | R | G | B | − | + | − | + | − | + |
|  | (Cy) | (Ma) | (Ye) | (+) | (−) | (+) | (−) | (+) | (−) |

It is assumed, as a non-limiting example, that color particles 5A in one of R, G and B colors are electrically charged with a positive polarity, and complementary color particles 5B in one of cyan, magenta and yellow colors are electrically charged with a negative polarity. If the charge polarities of the color particles 5A and the complementary color particles 5B (hereafter, the signs 5A and 5B may be omitted) are inverted from one to the other, the electrode polarities (positive and negative polarities) exemplified in Table 4 may likewise be inverted from one to the other. Positive and negative polarities indicated in brackets in FIG. 10 express such inverted polarities, which are similarly indicated in FIGS. 11-14 and FIGS. 16-19 to be described below.

When a red color (R) is to be displayed with the three cells #1, #2 and #3, as exemplified in a schematic partial cross-sectional view in FIG. 10, the control circuit 91 controls, for the cell #1, the polarity of the front surface electrode X1 to have a polarity (−) opposite to the charge polarity (+) of the R particles, and the polarity of the back surface electrode X3 to have a polarity (+) opposite to the charge polarity (−) of the Cy particles.

For the cell #2, the control circuit 91 controls the polarity of the front surface electrode X1 to have a polarity (+) opposite to the charge polarity (−) of the Mg particles, and the polarity of the back surface electrode X3 to have a polarity (−) opposite to the charge polarity (+) of the G particles.

For the cell #3, the control circuit 91 controls the polarity of the front surface electrode X1 to have a polarity (+) opposite to the charge polarity (−) of the Ye particles, and the polarity of the back surface electrode X3 to have a polarity (−) opposite to the charge polarity (+) of the B particles.

By the polarity control described above, the positively charged R particles in the cell #1, the negatively charged Mg particles in the cell #2 and the negatively charged Ye particles in the cell #3 are drawn to the side of the front surface electrodes X1 with the opposite polarities, respectively, while the particles that are electrically charged with opposite polarities and in complementary color relation with respect to the R, Ma and Ye particles in the cells #1, #2 and #3, respectively, are drawn to the side of the back surface electrodes X3, respectively.

Accordingly, the cell #1 displays a red color with the R particles, and the cell #2 and the cell #3 display a mixed color (equivalent to a red color display) with the two colors of the Ma particles and the Ye particles which are different from the Cy particles that is in complementary color relation with the R particles. As a result, red is displayed by the entire three cells #1, #2 and #3.

When a black color (K) is to be displayed with three cells #i, the control circuit 91 may control the polarities of the front surface electrode X1 and the back surface electrode X3 such that a mixed color of a combination of R, G and B or a combination of Cy, Ma and Ye is displayed. Also, the color particles that are placed in a non-display state relative to a target display color may not necessarily be positively drawn to the back surface electrode X3 side by controlling the polarity of the back surface electrode X3 to have an opposite polarity to the charge polarity. As long as the complementary color particles can be locally gathered in a region where the complementary color particles relatively become to be in a non-display state (for example, toward the side of the back surface electrode X3) as a result of the color particles corresponding to the target display color being drawn and locally gathered to the front surface electrode X1 side, the polarity of a part or all of the back surface electrodes X3 may be controlled to be in a grounded state (a non-polarity state).

2.2.2. Three-Electrode Structure

Figure 11:
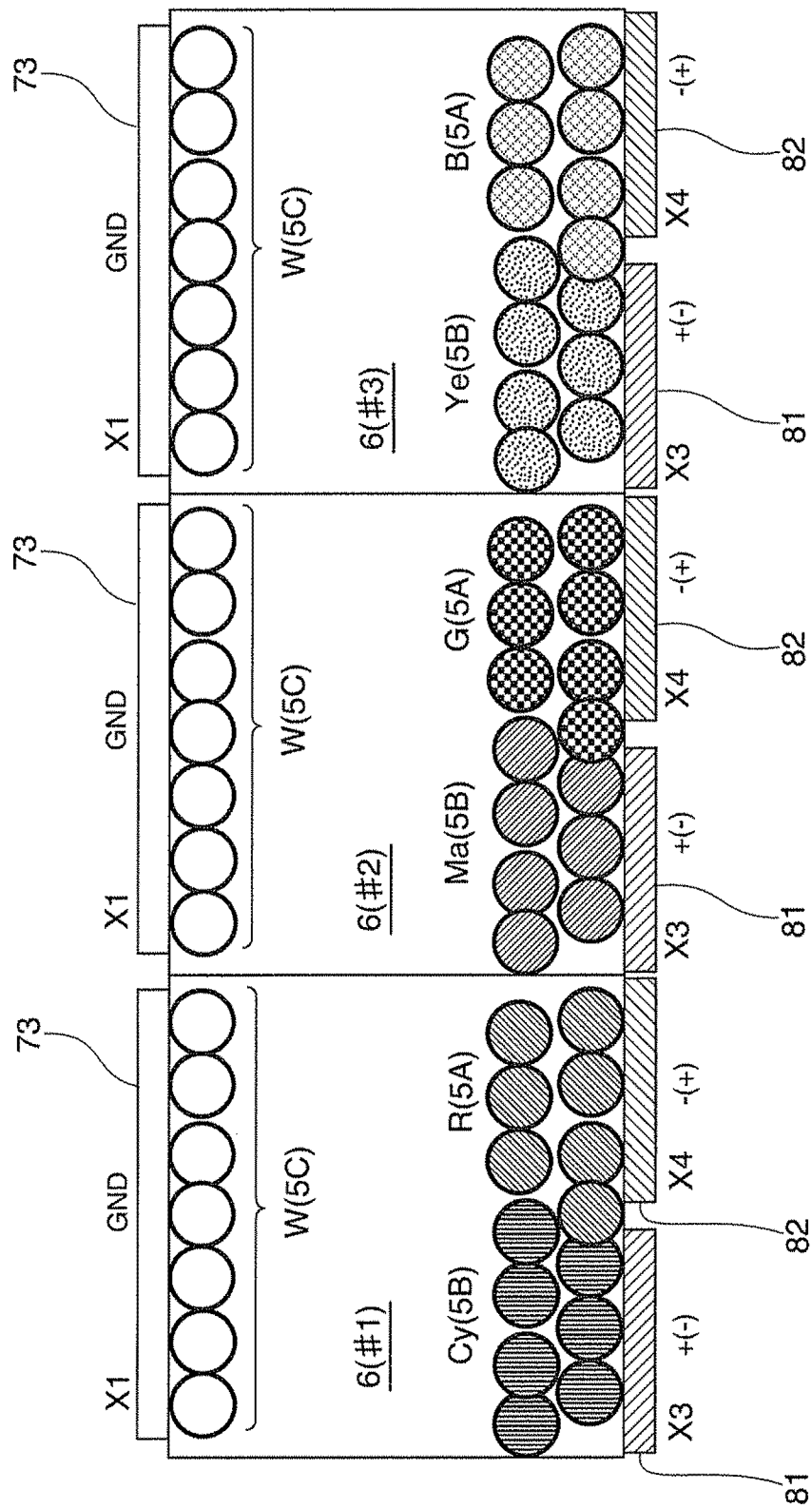
FIG. 11 is a schematic partial cross-sectional view showing another example of the electrode arrangement for three of the cells of the electrophoretic display device exemplified in FIG. 1 and FIG. 2 and its electrode polarity control in accordance with another embodiment, where a white color is displayed with a three-electrode structure.

As shown in a schematic partial cross-sectional view in FIG. 11, if white (W) particles 5C (or "white solvent") are further included in each of the cells #1, #2 and #3 shown in FIG. 10, one front surface electrode 73 and two back surface electrodes 81 and 82, three electrodes in total, are provided on each of the cells 6. By individually controlling the polarity of each of the electrodes 73, 81 and 82 by the control circuit 91, various colors (eight colors) including a white color can be displayed. Table 5 below shows examples of patterns of the polarities of voltages to be applied by the control circuit 91 to the front surface electrode 73 (X1) and the back surface electrodes 81 (X3) and 82 (C4).

TABLE 5

Examples of Patterns of Voltage Polarity

| Display Color | Cell #1 | Cell #2 | Cell #3 | Electrode Polarity Cell #1 | | | Electrode Polarity Cell #2 | | | Electrode Polarity Cell #3 | | |
|---|---|---|---|---|---|---|---|---|---|---|---|---|
| | | | | X1 | X3 | X4 | X1 | X3 | X4 | X1 | X3 | X4 |
| W | W | W | W | g | + | − | g | + | − | g | + | − |
| R | R | Ma | Ye | − | g | + | + | g | − | + | g | − |
| G | Cy | G | Ye | + | g | − | − | g | + | + | g | − |
| B | Cy | Ma | B | + | g | − | + | g | − | − | g | + |
| Cy | Cy | G | B | + | g | − | − | g | + | − | g | + |
| Ma | R | Ma | B | − | g | + | + | g | − | − | g | + |
| Ye | R | G | Ye | − | g | + | − | g | + | + | g | − |
| K | R | G | B | − | g | + | − | g | + | − | g | + |
| | (Cy) | (Ma) | (Ye) | (+) | (g) | (−) | (+) | (g) | (−) | (+) | (g) | (−) |

In this case also it is assumed that, as one of non-limiting examples, color particles 5A in one of R, G and B colors are electrically charged with a positive polarity, and complementary color particles 5B in one of cyan, magenta and yellow colors are electrically charged with a negative polarity. If the charge polarities of the color particles 5A and the complementary color particles 5B are inverted from one to the other, the electrode polarities (positive and negative polarities) exemplified in Table 5 may likewise be inverted from one to the other.

One example of electrode polarity control when displaying white (W), red (R) and cyan (Cy) with the three cells #1, #2 and #3 is described below.

White Display

When a white color (W) is to be displayed with the three cells #1, #2 and #3, as shown in a schematic partial cross-sectional view in FIG. 11, the control circuit 91 controls the polarity of each of the front surface electrodes of the cells #1, #2 and #3 to be in a grounded state (a non-polarity state), while controlling the polarities of the back surface electrodes X3 and X4 of each of the cells #1, #2 and #3 to be in mutually opposite (positive and negative) polarities. Which one of the back surface electrodes X3 and X4 should be controlled to have a positive polarity or a negative polarity may be decided identically or differently for each of the cells #1, #2 and #3.

By this, the color particles 5A and 5B that are positively or negatively charged in the cells #1, #2 and #3 are drawn to the side of the back surface electrodes X3 and X4, and the white particles 5C are relatively locally gathered to the side of the front surface electrodes X1. Accordingly, each of the three cells #1, #2 and #3 displays a white color.

Red Display

Figure 12:
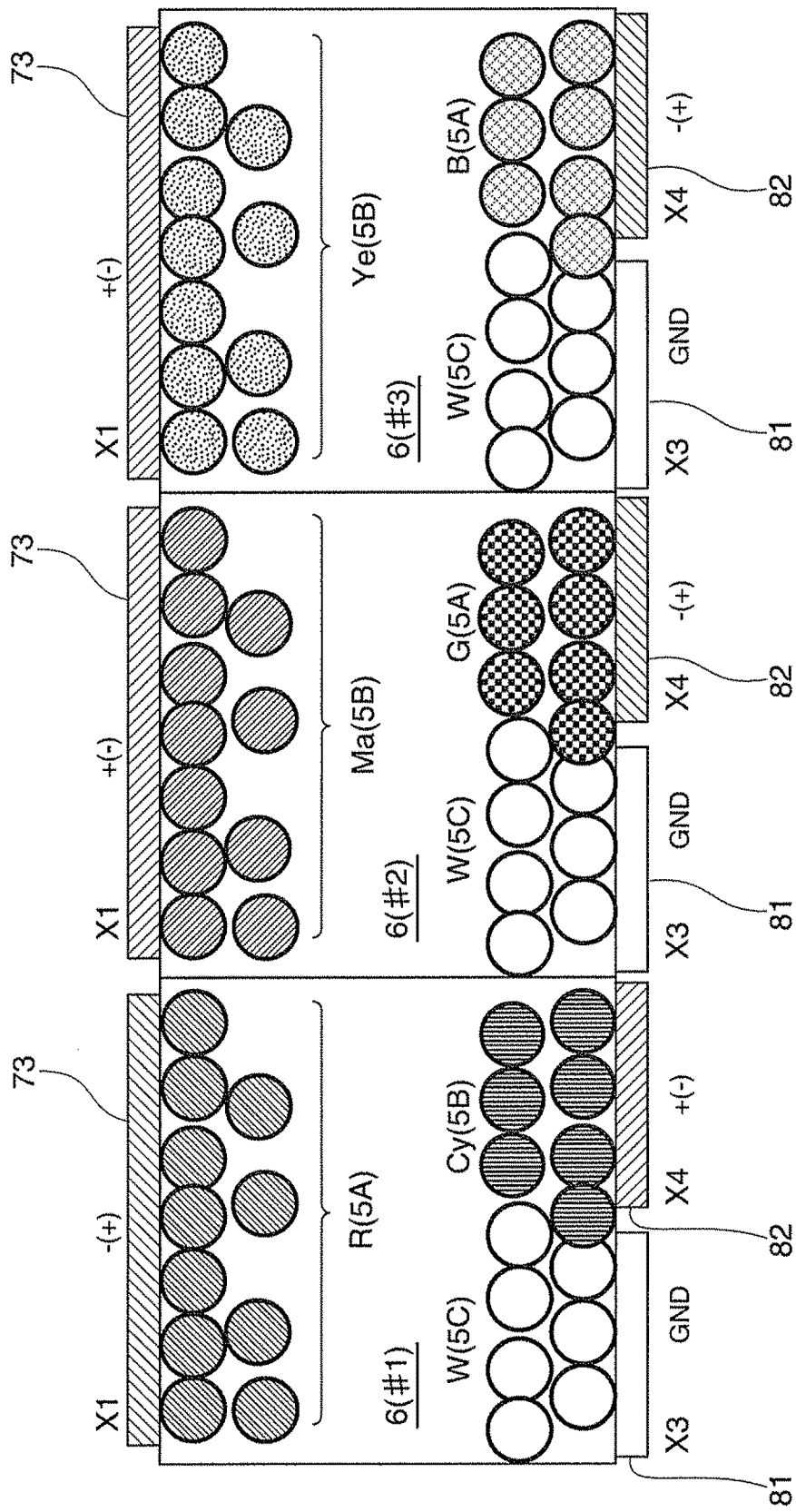
FIG. 12 is a schematic partial cross-sectional view showing an example of a state of displaying red with the three-electrode structure exemplified in FIG. 11.

When a red color (R) is to be displayed with the three cells #1, #2 and #3, as shown in a schematic partial cross-sectional view in FIG. 12, the control circuit 91 controls, for the cell #1, the polarity of the front surface electrode X1 to have a polarity (−) opposite to the charge polarity (+) of the R particles, while controlling the polarity of one of the back surface electrodes X3 (or X4) to be in a grounded state, and the polarity of the other back surface electrode X4 (or X3) to have a polarity (+) opposite to the charge polarity (−) of the Cy particles.

Also, the control circuit 91 controls, for the cell #2, the polarity of the front surface electrode X1 to have a polarity (+) opposite to the charge polarity (−) of the Ma particles, while controlling the polarity of one of the back surface electrodes X3 (or X4) to be in a grounded state, and the polarity of the other back surface electrode X4 (or X3) to have a polarity (−) opposite to the charge polarity (+) of the G particles.

Furthermore, the control circuit 91 controls, for the cell #3, the polarity of the front surface electrode X1 to have a polarity (+) opposite to the charge polarity (−) of the Ye particles, while controlling the polarity of one of the back surface electrodes X3 (or X4) to be in a grounded state, and the polarity of the other back surface electrode X4 (or X3) to have a polarity (−) opposite to the charge polarity (+) of the B particles.

By the polarity control described above, the positively charged R particles in the cell #1, the negatively charged Ma particles in the cell #2 and the negatively charged Ye particles in the cell #3 are drawn to the viewing side, that is the front surface electrodes X1 side, respectively, while the particles that are electrically charged with opposite polarities to and in complementary color relation with the R, Ma and Ye particles in the cells #1, #2 and #3 are drawn to the side of the back surface electrodes X4. As a result, in each of the cells #1, #2 and #3, the white particles 5C can be relatively, locally gathered adjacent to the other back surface electrodes X3 (or X4).

Accordingly, the cell #1 displays a red color with the R particles, and the cells #2 and #3 display a mixed color (equivalent to a red color display) with the Ma particles and the Ye particles of two colors which are different from the Cy particles that is in complementary color relation with the R particles. As a result, a red color is displayed by the entire three cells #1, #2 and #3.

Cyan Display

Figure 13:
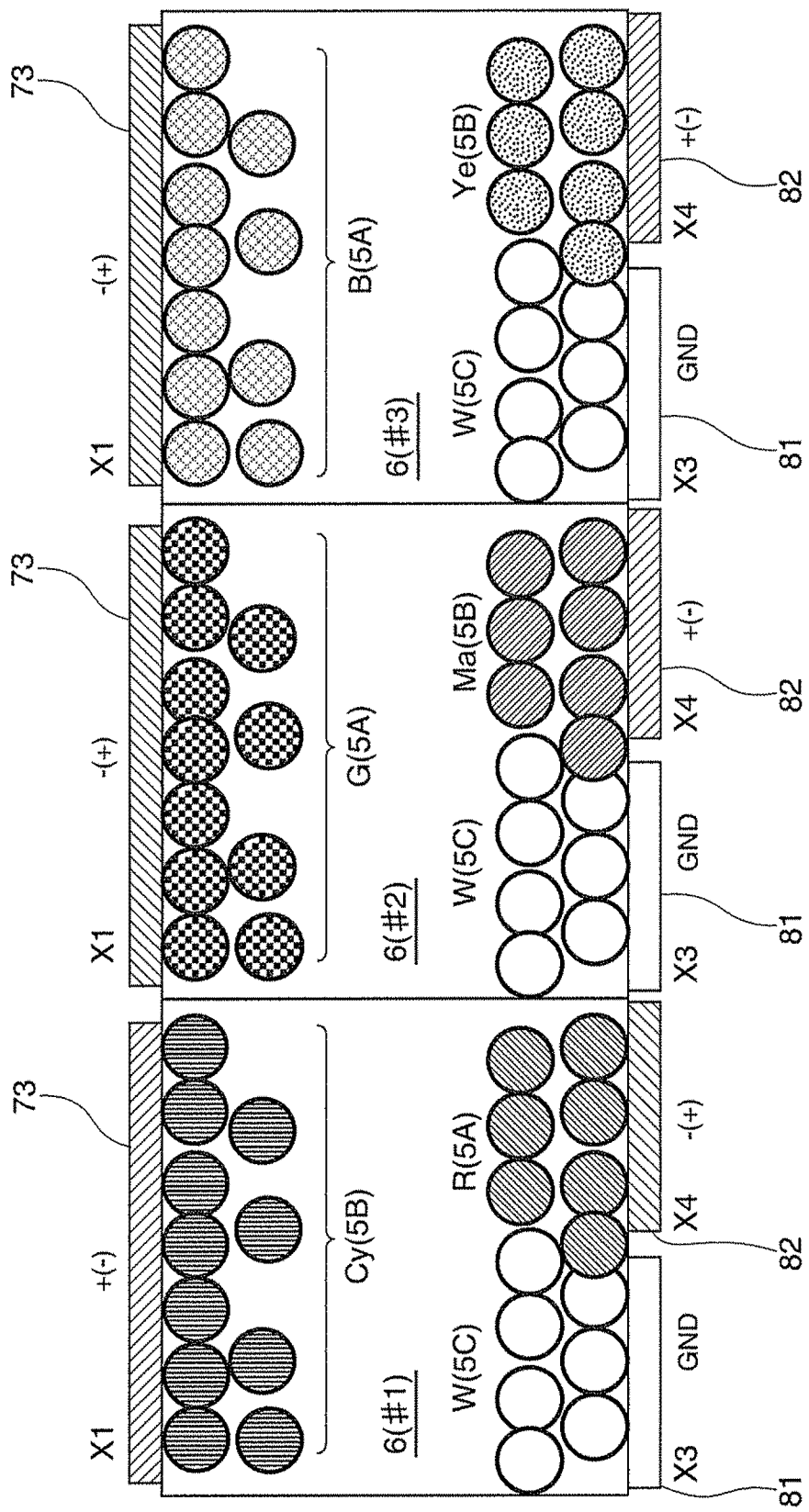
FIG. 13 is a schematic partial cross-sectional view showing an example of displaying cyan with the three-electrode structure exemplified in FIG. 11.

When a cyan color (Cy) is to be displayed with the three cells #1, #2 and #3, as shown in a schematic partial cross-sectional view in FIG. 13, the control circuit 91 controls, for the cell #1, the polarity of the front surface electrode X1 to have a polarity (+) opposite to the charge polarity (−) of the Cy particles, while controlling the polarity of one of the back surface electrodes X3 (or X4) to be in a grounded state, and the polarity of the other back surface electrode X4 (or X3) to have a polarity (−) opposite to the charge polarity (+) of the R particles.

Also, the control circuit 91 controls, for the cell #2, the polarity of the front surface electrode X1 to have an opposite polarity to the charge polarity (+) of the G particles, while controlling the polarity of one of the back surface electrodes X3 (or X4) to be in a grounded state, and the polarity of the other back surface electrode X4 (or X3) to have a polarity (+) opposite to the charge polarity (−) of the Mg particles.

Furthermore, the control circuit 91 controls, for the cell #3, the polarity of the front surface electrode X1 to have an opposite polarity to the charge polarity (+) of the B particles, while controlling the polarity of one of the back surface electrodes X3 (or X4) to be in a grounded state, and the polarity of the other back surface electrode X4 (or X3) to have a polarity (+) opposite to the charge polarity (−) of the Ye particles.

By the polarity control described above, the negatively charged Cy particles in the cell #1, the positively charged G particles in the cell #2 and the positively charged B particles in the cell #3 are drawn to the side of the front surface electrodes X1 having their opposite polarities, respectively, while the particles that are electrically charged with opposite polarities to and in complementary color relation with the Cy, G and B particles in the cells #1, #2 and #3 are drawn to the side of the back surface electrodes X4. As a result, in each of the cells #1, #2 and #3, the white particles 5C can be relatively, locally gathered adjacent to the other back surface electrodes X3.

Accordingly, the cell #1 displays a cyan color with the Cy particles, and the cells #2 and #3 display a mixed color (equivalent to a cyan color display) with the G particles and the B particles of two colors which are different from the R particles that is in complementary color relation with the Cy particles. As a result, a cyan color is displayed by the entire three cells #1, #2 and #3.

It is noted that when the cell #i is controlled to have a display state with one of the color particles 5A and 5B, the back surface electrode to be controlled to have a grounded state may be either X3 or X4 in each of the cells #i, because it is sufficient if the other of the color particles 5A and 5B and the white particles 5C can be locally gathered to the sides of the back surface electrodes X3 and X4.

2.2.3. When Second Color Substance is Color Solution (Complementary Color Solution) is in Complementary Color Relation with First Color Substance Next, another example of the electrode structure and electrode polarity control is described. In this example, an example of the first color substance 5A included in each of the cells #i is color particles having one of three colors, red, green and blue (R, G and B), and an example of the second color substance 5B included in the same cell #i is a solvent having one color different from the color of the first color particles 5A among cyan, magenta and yellow colors (C, Y and M) that are complementary colors of R, G and B.

It is assumed, as a non-limiting example, that color particles 5A in the respective cells #i are electrically charged with the same polarity. Also, by further including white (W) particles 5C as one example of the third color substance in each of the cells #i, a full color display becomes possible. Each of the white particles 5A may be set to have a polarity opposite to the charge polarity of the first color particles 5A, and have a smaller charge amount than the charge amount of each of the first color particles 5A. This setting makes it possible for the white particles 5C to be readily dispersed and suspended in a region intermediate between the front surface electrode and the back surface electrode of the cell #i, in the case of displaying colors other than white.

In this example, as shown in schematic partial cross-sectional views in FIGS. 16-19, one front surface electrode 73 (X1) and two back surface electrodes 81 (X3) and 82 (X4), three electrodes in total, are provided on each of the cells 6. By individually controlling the polarity of each of the electrodes 73, 81 and 82 by the control circuit 91, the color particles 5A may be locally gathered to the side of the front surface electrode X1 such that the color of the complementary color solution 5B (hereafter, the sign 5B may be omitted) in one of the colors C, Y and M cannot be seen from the viewing side, that is the side of the front surface electrode X1 or, in reverse, the color particles 5A may be moved away from the front surface electrode X1 side such that the color of the complementary color solution 5B can be seen from the side of the front surface electrode X1 that is the viewing side. It is noted that the color particles 5A moved away from the front surface electrode X1 can be hidden, by dispersing the white particles 5C within the cell #i, so as not to be seen from the viewing side. This makes it possible to control each of the cells #i to have a state of displaying one of the six colors of RGB and CMY.

White Display

Figure 16:
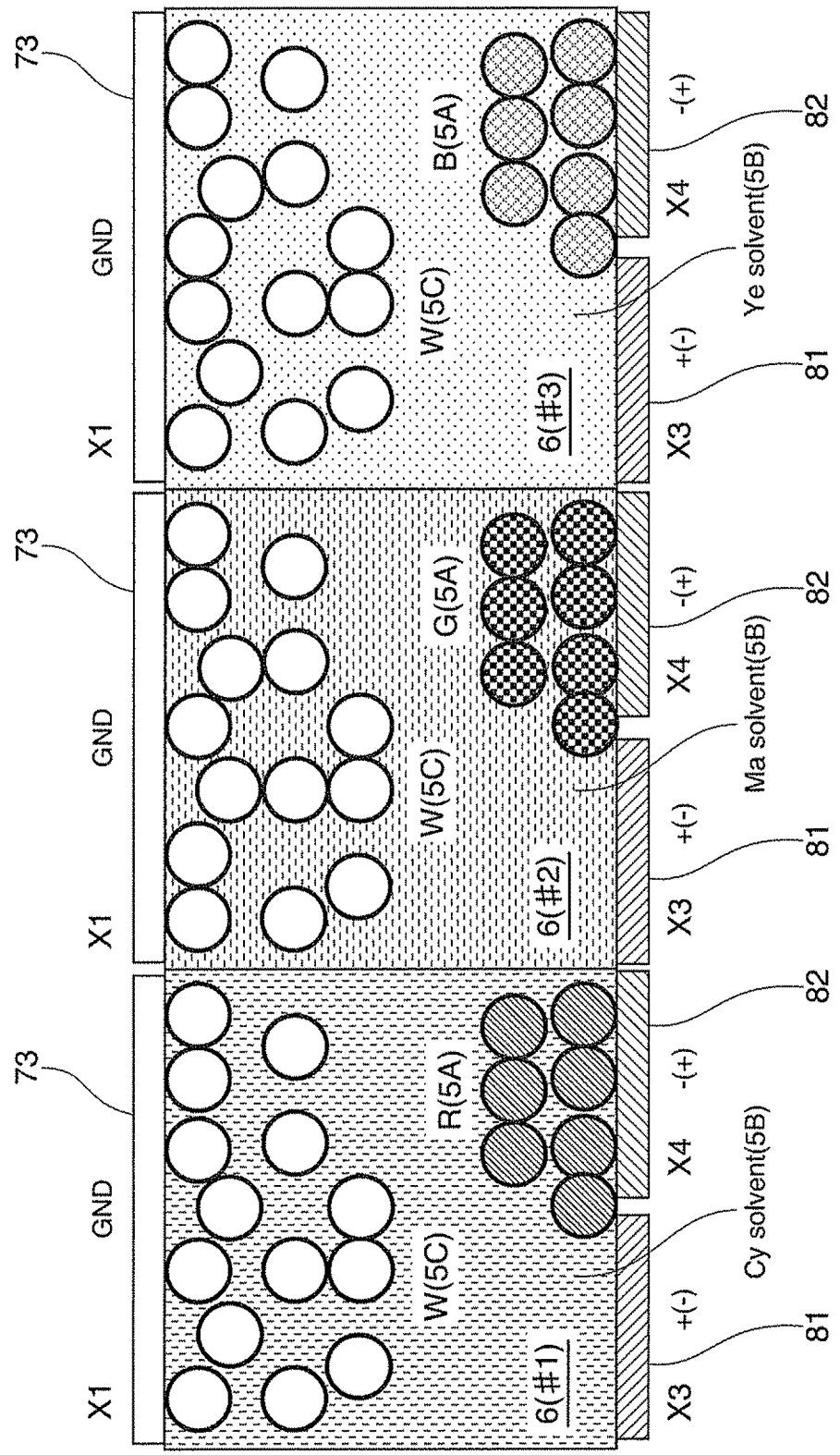
FIG. 16 is a schematic partial cross-sectional view showing an example of displaying white with a three-electrode structure, when the three cells of the electrophoretic display device exemplified in FIG. 1 and FIG. 2 contain medium of complementary color in place of complementary color particles.

For example, when a white color is to be displayed with the three cells #1, #2 and #3, as shown in FIG. 16, the control circuit 91 controls, for each of the three cells #i, the back surface electrodes X3 and X4 to have mutually opposite (positive and negative) polarities, while controlling the polarity of the front surface electrode X1 to be in a grounded state. Which one of the back surface electrodes X3 and X4 in each of the cells #i should be controlled to have a positive polarity or a negative polarity may be decided identically or differently for each of the cells #i. By such electrode polarity control, the color particles 5A in one of the RGB colors in the respective three cells #i are drawn to the respective back surface electrodes X4 (or X3).

On the other hand, since each of the white particles 5C has an opposite polarity with respect to the color particles 5A in one of RGB colors, and has a smaller charge amount than the charge amount of each of the color particles 5A, the white particles 5C would more readily be dispersed away, relatively, in association with the color particles 5A, from the back surface electrode X4 (or X3) to which the color particles 5A in one of RGB colors are drawn, in other words, the back surface electrode X4 (or X3) having the same polarity as the charge polarity of the white particles 5C. Therefore, in each of the cells #i, the white particles 5C would locally gather to the side of the front surface electrode X1, that is, the viewing side, such that each of the complementary color solvents 5B in CMY colors would be hidden by the white particles 5C when viewed from the viewing side. In this manner, each of the cells #i can be placed in a white display state with the white particles 5C.

Red Display

Figure 17:
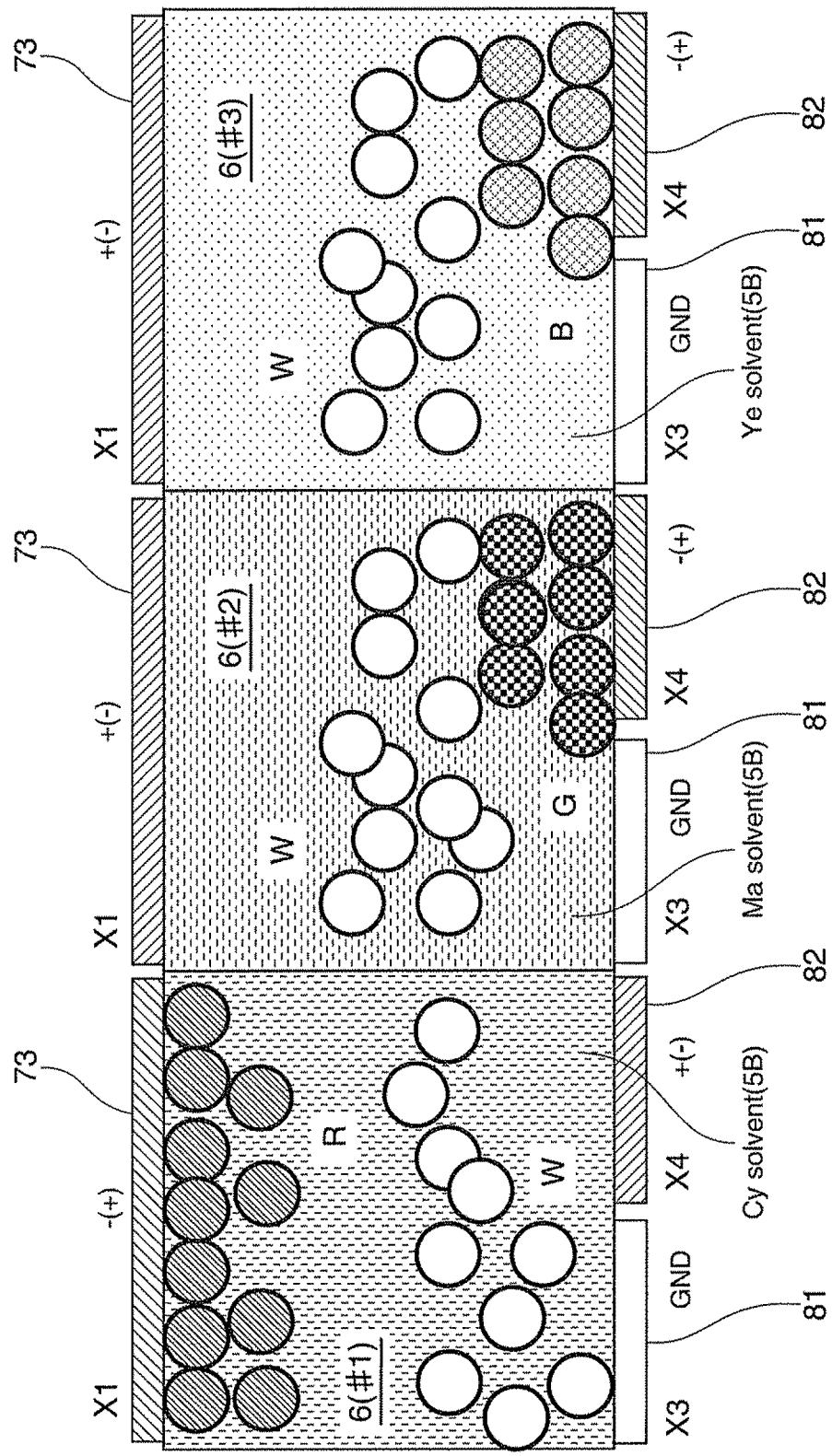
FIG. 17 is a schematic partial cross-sectional view showing an example of a state of displaying red with the three-electrode structure exemplified in FIG. 16.

When a red color (R) is to be displayed with the three cells #1, #2 and #3, as shown in FIG. 17, the control circuit 91 controls, for the cell #1, the polarity of the front surface electrode X1 to have an opposite polarity to the charge polarity of the R particles, while controlling the polarity of one of the back surface electrodes X3 (or X4) to be in a grounded state, and the polarity of the other back surface electrode X4 (or X3) to have an opposite polarity to the charge polarity of the front surface electrode X1.

Also, the control circuit 91 controls, for the cell #2, for example, the polarity of one of the back surface electrodes X3 (or X4) to be in a grounded state, and the polarity of the other back surface electrode X4 (or X3) to have an opposite polarity to the charge polarity of the G particles, while controlling the polarity of the front surface electrode X1 to be an opposite polarity to the polarity of the back surface electrode X4 (or X3).

Furthermore, the control circuit 91 controls, for the cell #3, for example, the polarity of one of the back surface electrodes X3 (or X4) to be in a grounded state, and the polarity of the other back surface electrode X4 (or X3) to have an opposite polarity to the charge polarity of the B particles, while controlling the polarity of the front surface electrode X1 to be an opposite polarity to the polarity of the back surface electrode X4 (or X3).

By the polarity control described above, in the cell #1, the positively charged R particles are drawn to the side of the front surface electrode X1 having the opposite polarity, while the white particles 5C would more readily be dispersed and stay in a region that is removed from the front surface electrode X1 where the R particles are locally gathered, and where the pulling force and the repelling force by electric fields working thereon and generated by the front surface electrode X1 and the back surface electrode X4 (or X3) having mutually opposite polarities are balanced.

In the cells #2 and #3, the positively charged G particles and B particles are drawn to the side of the back surface electrode X4 (or X3) having the opposite polarity. On the other hand, the white particles 5C in the cells #2 and #3 would more readily be dispersed and stay in a region that is removed from the back surface electrode X4 (or X3) where the color particles 5A with one of RGB colors are locally gathered, and where the pulling force and the repelling force by electric fields working thereon and generated by the front surface electrode X1 and the back surface electrode X3 (or X4) having mutually opposite polarities are balanced. This creates a state in which the Ma solvent and the Ye solvent can be seen from the viewing sides of the cells #2 and #3. In this instance, the colors of the G particles and the B particles are placed in a state not to be seen due to reflection of light on the white particles 5C dispersed in the cells #2 and #3.

Accordingly, the cell #1 displays a red color with the R particles, and the cells #2 and #3 display a mixed color (equivalent to a red color display) with the Ma solvent and the Ye solvent of two colors different from Cy that is in complementary color relation with the R particles, whereby a red color is displayed by the entire three cells #1, #2 and #3.

Cyan Display

Figure 18:
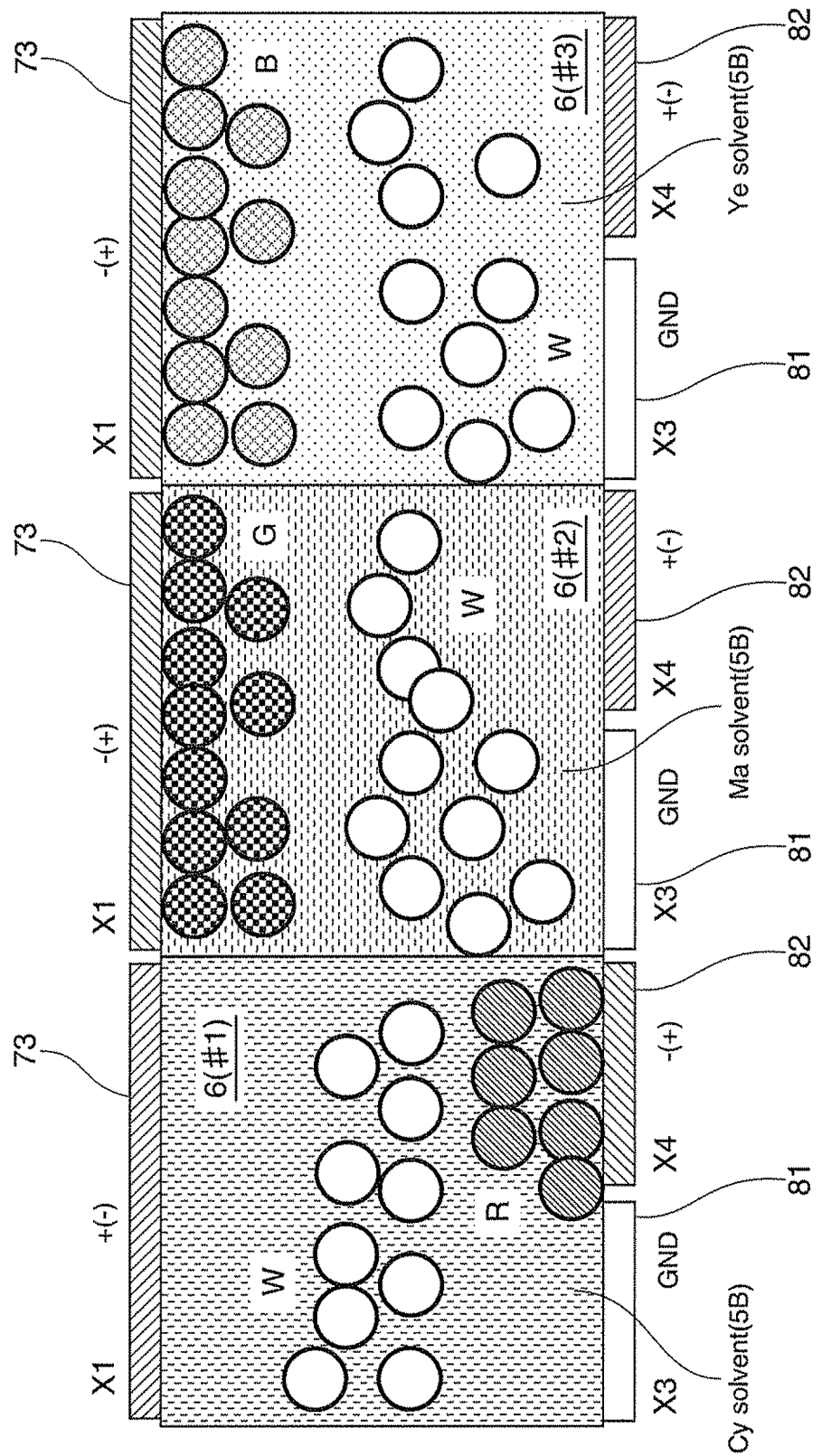
FIG. 18 is a schematic partial cross-sectional view showing an example of a state of displaying cyan with the three-electrode structure exemplified in FIG. 16.

When a cyan color is to be displayed with the three cells #1, #2 and #3, as shown in FIG. 18, the control circuit 91 controls, for the cell #1, the polarity of one of the back surface electrodes X3 (or X4) to be in a grounded state, and the polarity of the other back surface electrode X4 (or X3) to have an opposite polarity to the charge polarity of the R particles, while controlling the polarity of the front surface electrode X1 to be an opposite polarity to the polarity of the back surface electrode X4 (or X3).

Also, the control circuit 91 controls, for the cell #2, the polarity of the front surface electrode X1 to be an opposite polarity to the charge polarity of the G particles, while controlling the polarity of one of the back surface electrodes X3 (or X4) to be in a grounded state, and the polarity of the other back surface electrode X4 (or X3) to be an opposite polarity to the polarity of the front surface electrode X1.

Furthermore, the control circuit 91 controls, for the cell #3, the polarity of the front surface electrode X1 to be an opposite polarity to the charge polarity of the B particles, while controlling the polarity of one of the back surface electrodes X3 (or X4) to be in a grounded state, and the polarity of the other back surface electrode X4 (or X3) to be an opposite polarity to the polarity of the front surface electrode X1.

By the polarity control described above, in the cell #1, the positively charged R particles are drawn to the side of the back surface electrode X4 (or X3) having the opposite polarity, while the white particles 5C would more readily be dispersed and stay in a region that is removed from the back surface electrode X4 (or X3) where the R particles are locally gathered, and where the pulling force and the repelling force by electric fields working thereon and generated by the front surface electrode X1 and the back surface electrode X4 (or X3) having mutually opposite polarities are balanced. Accordingly, the Cy medium becomes visible from the viewing side of the cell #1. In this instance, the color of the R particles becomes invisible due to reflection of light on the white particles 5C dispersed in the cell #1.

The positively charges G particles and B particles in the cells #2 and #3 are drawn toward the front surface electrodes X1 having the opposite polarity, respectively. On the other hand, the white particles 5C in the cells #2 and #3 would more readily be dispersed and stay in a region that is removed from the front surface electrode X1 where the G particles or the B particles are locally gathered, and where the pulling force and the repelling force by electric fields working thereon and generated by the front surface electrode X1 and the back surface electrode X3 (or X4) having mutually opposite polarities are balanced.

Accordingly, the cell #1 displays a cyan color with the Cy solvent, and the cells #2 and #3 display a mixed color (equivalent to a cyan color display) with the G particles and the B particles of two colors different from R that is in complementary color relation with Cy, whereby a cyan color is displayed by the entire three cells #1, #2 and #3.

Black Display

Figure 19:
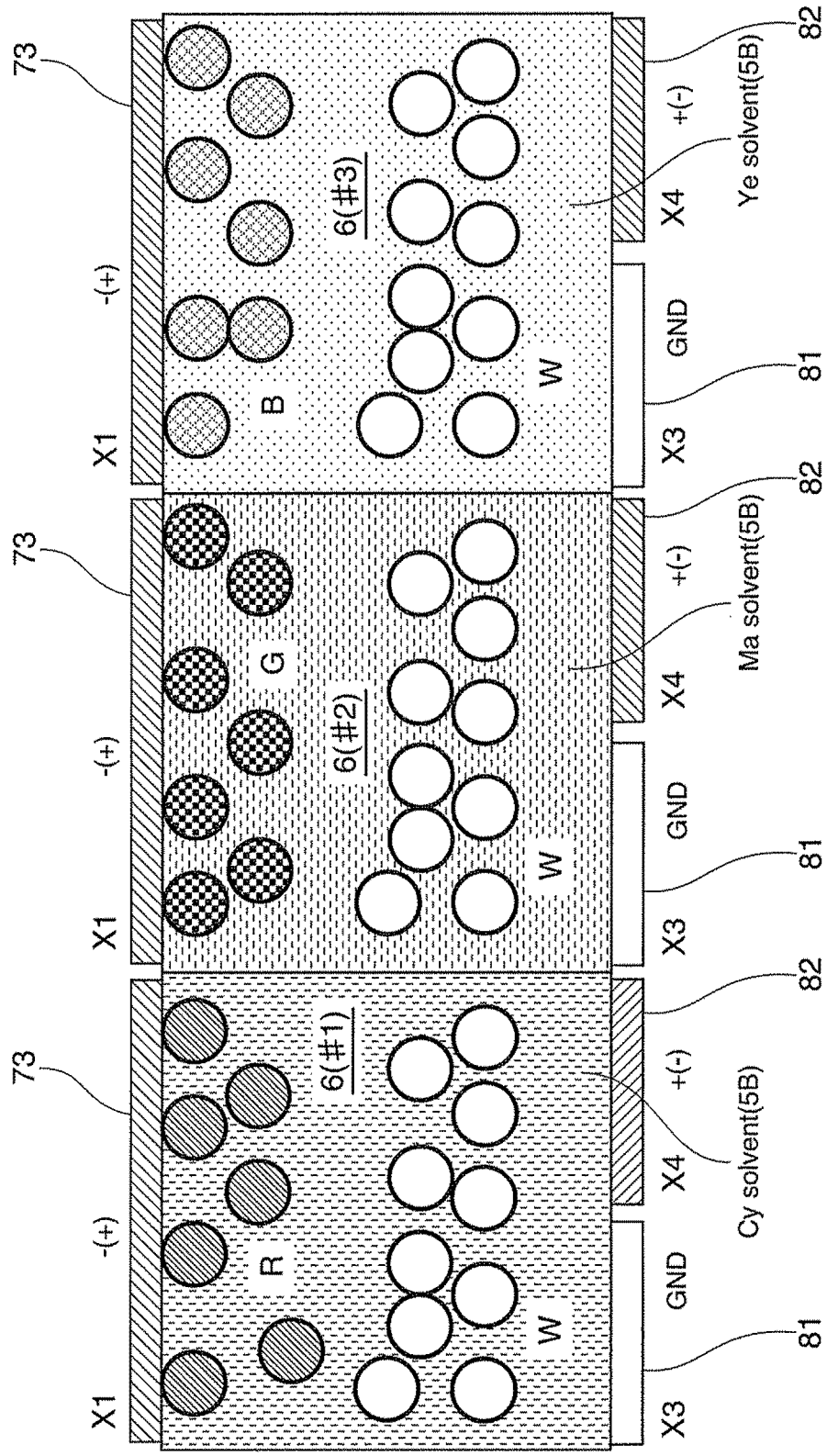
FIG. 19 is a schematic partial cross-sectional view showing an example of a state of displaying black with the three-electrode structure exemplified in FIG. 16.

When displaying a black color with the three cells #1, #2 and #3, as exemplified in FIG. 19, the control circuit 91 controls the polarities of the front surface electrodes X1 and the back surface electrodes X3 and X4 such that both the R particles and the Cy solvent in the cell #1, both the G particles and Ma solvent in the cell #2, and both the B particles and the Ye solvent in the cell #3 are visible from the viewing side (on the side of the front surface electrode X1).

Two controlling methods can be exemplified in this case.

(a) First Method: The control circuit 91 controls the front surface electrode X1 of each of the cells #1-#3 to have an opposite polarity to the charge polarity of the color particles 5A in one of the RGB colors, and controls one of the back surface electrode X3 (or X4) to have a grounded state, and the other back surface electrode X4 (or X3) to be in an opposite polarity to the front surface electrode X1.

Here, the control circuit 91 continues applying voltages to the front surface electrode X1 and the back surface electrode X4 (or X3) in a limited specified period of time shorter than a period of time from the time at which application of the voltages to the front surface electrode X1 and the back surface electrode X4 (or X3) is started until the color of the complementary color solvent 5B becomes invisible from the viewing side (for example, until the inner wall surface of the cells #i on the front surface electrode X1 side is completely covered by the color particles 5A in one of the RGB colors). In other words, the control circuit 91 stops the voltage application when the specified period of time elapses. It is noted that the period of time from the time of starting voltage application until the color of the complementary color solvent 5B becomes invisible from the viewing side (for example, until the viewing side is completely covered by the color particles 5A) may be obtained in experimental values or in logical values based on electrophoretic speeds of the RGB color particles 5A. The experimental values or the logical values may be stored in a memory or the like of the control circuit 91.

By limiting the voltage application time in such a manner as described above, as shown in FIG. 19, the R particles in the cell #1, the G particles in the cell #2 and the B particles in the cell #3 are drawn to the side of the front surface electrodes X on the viewing side, respectively, and dispersed and disposed to the extent that they do not completely cover the viewing side. On the other hand, the white particles 5C in each of the cells #1-#3 would more readily be dispersed and stay in a region that is removed from the front surface electrode X1 where the color particles in one of the RGB colors are locally gathered, and where the pulling force and the repelling force by electric fields working thereon and generated by the front surface electrode X1 and the back surface electrode X4 (or X3) having mutually opposite polarities are balanced.

Therefore, as viewed from the viewing side, the cell #1 displays a mixed color of red with the R particles and cyan with the Cy solvent, the cell #2 displays a mixed color of green with the G particles and magenta with the Ma solvent, and the cell #3 displays a mixed color of blue with the B particles and yellow with the Ye solvent, whereby a black color created by a mixed color of the six colors of RGB and CMY can be displayed by the entire three cells #1-#3.

(b) Second Method: Instead of limiting the voltage application time like the first method, the viewing side is once completely covered by the color particles 5A in RGB colors such that the complementary color solvent 5B becomes invisible from the viewing side, and then the front surface electrode X1 is controlled to have a positive polarity temporarily. For example, the control circuit 91 controls the front surface electrode X1 of each of the cells #1-#3 to have an opposite polarity to the charge polarity of the color particles in a corresponding one of the RGB colors, and controls one of the back surface electrodes X3 (or X4) to have a grounded state and the other back surface electrode X4 (or X3) to be in an opposite polarity to the front surface electrode X1.

By this control, the viewing side is completely covered by the color particles 5A in the respective RGB colors such that the complementary color solvent 5B becomes invisible from the viewing side of each of the cells #1-#3, and then the control circuit 91 controls the front surface electrode X1 to have a positive polarity in a short time (for example about 20 ms). As a result, the color particles 5A that are completely covering the viewing side electrophoretically move away from the front surface electrode X1, and the complementary color solvent 5B becomes partially visible from the viewing side. Accordingly, as viewed from the viewing side, the cell #1 displays a mixed color of red with the R particles and cyan with the Cy solvent, the cell #2 displays a mixed color of green with the G particles and magenta with the Ma solvent, and the cell #3 displays a mixed color of blue with the B particles and yellow with the Ye solvent, whereby a black color created by a mixed color of the six colors of ROB and CMY can be displayed by the entire three cells #1-#3.

3. Others

Various electronic apparatuses may be equipped with the electrophoretic display device 1 described above. Examples of electronic apparatuses equipped with the electrophoretic display device 1 include an electronic paper, an electronic book, a television set, a viewfinder type or monitor viewing type video tape recorder, a car navigation system, a pager, an electronic notebook, an electronic calculator, an electronic newspaper, a word processor, a personal computer, a workstation, a TV phone, a POS terminal, a device equipped with a touch panel and the like.

What is claimed is:

1. An electrophoretic display comprising: a plurality of cells including a first cell, a second cell and a third cell, each of the plurality of cells being spatially divided and containing a plurality of types of color particles constituting a display color, the display color being controlled by controlling electrophoresis of the plurality of types of color particles, and a first transparent electrode having a first polarity and a second transparent electrode having a second polarity provided on a side of the cells configured to be viewed in a viewing direction, the plurality of types of color particles including first color particles, second color particles, third color particles that correspond to one of three primary colors in additive color mixing or subtractive color mixing, the first color particles, the second color particles, the third color particles being mutually different, and fourth color particles that are in a relationship of complementary colors with the first color particles, fifth color particles that are in a relationship of complementary colors with the second color particles, and sixth color particles that are in a relationship of complementary colors with the third color particles, the first cell including the first color particles and the fourth color particles, the second cell including the second color particles and the fifth color particles, the third cell including the third color particles and the sixth color particles, the second cell being controlled to be in a display state by the fifth color particles and third cell being controlled to be in a display state by the sixth color particles, when the first cell is controlled to be in a display state by the first color particles, and when the first to sixth particles are gathered in a vicinity of the first and second transparent electrodes, respectively, the first polarity changing with the second polarity.

2. An electrophoretic display according to claim 1, the first color particles and the fourth color particles being electrically charged with mutually opposite polarities, respectively.

3. An electrophoretic display according to claim 1, each of the first cell, the second cell and the third cell further including white particles or a white solvent.

4. An electrophoretic display according to claim 3, the white particles being non-charged or having a charge amount smaller than a charge amount of the first color particles.

5. An electrophoretic display according to claim 1, the first color particles having a first color, and the fourth color particles are color solvent having a different color than the first color.

6. An electrophoretic display according to claim 5, each of the first cell, the second cell, and third cell further including white particles.

7. An electrophoretic display according to claim 6, the white particles being electrically charged with a polarity opposite to a charge polarity of the first color particles, the second color particles, and the third color particles.

8. An electrophoretic display according to claim 1, when the first cell is controlled to be in a mixed color display state with the first color particles together with the fourth color particles, the second cell is controlled to be in a mixed color display state with the fifth color particles with the second color particles, and third cell is controlled to be in a mixed color display state with the sixth color particles together with the third color particles.

9. An electrophoretic display device comprising the electrophoretic display recited in claim 1, and a control circuit that controls the display state.

10. An electronic apparatus comprising the electrophoretic display device recited in claim 9.

11. An electrophoretic display comprising: a plurality of cells including a first cell, a second cell and a third cell, each of the plurality of cells being spatially divided and containing a plurality of types of color particles constituting a display color, the display color being controlled by controlling electrophoresis of the plurality of types of color particles, and a first transparent electrode having a first polarity and a second transparent electrode having a second polarity provided on a side of the cells to configured to be viewed in a view by direction, the plurality of types of color particles including first color particles, second color particles, third color particles that correspond to one of three primary colors in additive color mixing or subtractive color mixing, the first color particles, the second color particles, the third color particles being mutually different, and fourth color particles that are in a relationship of complementary colors with the first color particles, fifth color particles that are in a relationship of complementary colors with the second color particles, and sixth color particles that are in a relationship of complementary colors with the third color particles, the first cell including the first color particles and the fourth color particles, the second cell including the second color particles and the fifth color particles, the third cell including the third color particles and the sixth color particles, the second cell being controlled to be in a display state by the fifth color particles and third cell being controlled to be in a display state by the sixth color particles, when the first cell is controlled to be in a display state by the first color particles, and the first transparent electrode being supplied with positive or negative polarity, and the second transparent electrode being grounded.

12. The electrophoretic display according to claim 11, further comprising a control circuit configured to change the status of the second transparent electrode by applying a voltage to the second transparent electrode and by making the second polarity the same as the first polarity.

* * * * *